United States Patent
Conway

(10) Patent No.: US 12,509,703 B2
(45) Date of Patent: Dec. 30, 2025

(54) CONTROLLED TRANSGENE EXPRESSION IN REGULATORY T CELLS

(71) Applicant: Sangamo Therapeutics, Inc., Richmond, CA (US)

(72) Inventor: Anthony Conway, Emeryville, CA (US)

(73) Assignee: SANGAMO THERAPEUTICS, INC., Richmond, CA (US)

(*) Notice: Subject to any disclaimer, the term of this patent is extended or adjusted under 35 U.S.C. 154(b) by 668 days.

(21) Appl. No.: 16/880,402

(22) Filed: May 21, 2020

(65) Prior Publication Data

US 2020/0368279 A1    Nov. 26, 2020

Related U.S. Application Data

(60) Provisional application No. 62/850,963, filed on May 21, 2019.

(51) Int. Cl.
| | |
|---|---|
| *C12N 15/90* | (2006.01) |
| *A61K 35/17* | (2015.01) |
| *A61K 40/11* | (2025.01) |
| *A61K 40/22* | (2025.01) |
| *A61K 40/31* | (2025.01) |
| *A61K 40/42* | (2025.01) |
| *C12N 5/0783* | (2010.01) |
| *C12N 5/10* | (2006.01) |
| *C12N 15/86* | (2006.01) |

(52) U.S. Cl.
CPC .............. *C12N 15/86* (2013.01); *A61K 40/11* (2025.01); *A61K 40/22* (2025.01); *A61K 40/31* (2025.01); *A61K 40/42* (2025.01); *C12N 5/0637* (2013.01); *C12N 5/0636* (2013.01); *C12N 2710/10043* (2013.01); *C12N 2740/15043* (2013.01)

(58) Field of Classification Search
None
See application file for complete search history.

(56) References Cited

U.S. PATENT DOCUMENTS

| | | |
|---|---|---|
| 8,697,359 B1 | 4/2014 | Zhang |
| 8,735,153 B2 | 5/2014 | Wolffe et al. |
| 8,771,945 B1 | 7/2014 | Zhang |
| 8,771,985 B2 | 7/2014 | Cui et al. |
| 8,772,008 B2 | 7/2014 | Doyon |
| 8,772,453 B2 | 7/2014 | Paschon et al. |
| 8,795,965 B2 | 8/2014 | Zhang |
| 8,865,406 B2 | 10/2014 | Zhang et al. |
| 8,871,445 B2 | 10/2014 | Cong et al. |
| 8,889,356 B2 | 11/2014 | Zhang |
| 8,895,308 B1 | 11/2014 | Zhang et al. |
| 8,906,616 B2 | 12/2014 | Zhang et al. |
| 8,921,112 B2 | 12/2014 | Cai et al. |
| 8,932,814 B2 | 1/2015 | Cong et al. |
| 8,936,936 B2 | 1/2015 | Holmes et al. |
| 8,945,839 B2 | 2/2015 | Zhang |
| 8,945,868 B2 | 2/2015 | Collingwood et al. |
| 8,956,828 B2 | 2/2015 | Bonini et al. |
| 8,993,233 B2 | 3/2015 | Zhang et al. |
| 8,999,641 B2 | 4/2015 | Zhang et al. |
| 9,234,187 B2 | 1/2016 | Rebar et al. |
| 9,234,188 B2 | 1/2016 | Rebar et al. |
| 9,238,803 B2 | 1/2016 | Rebar et al. |
| 9,394,545 B2 | 7/2016 | Rebar |
| 9,428,756 B2 | 8/2016 | Cai et al. |
| 9,567,609 B2 | 2/2017 | Paschon et al. |
| 9,597,357 B2 | 3/2017 | Gregory et al. |
| 9,616,090 B2 | 4/2017 | Conway et al. |
| 9,717,759 B2 | 8/2017 | Holmes et al. |
| 9,757,420 B2 | 9/2017 | Gregory et al. |
| 9,765,360 B2 | 9/2017 | DeKelver et al. |
| 9,790,490 B2 | 10/2017 | Zhang et al. |
| 9,834,787 B2 | 12/2017 | Gregory et al. |
| 9,957,526 B2 | 5/2018 | Holmes et al. |
| 10,000,772 B2 | 6/2018 | Doudna et al. |
| 10,072,062 B2 | 9/2018 | Collingwood et al. |
| 10,081,661 B2 | 9/2018 | Miller et al. |
| 10,113,167 B2 | 10/2018 | Doudna et al. |
| 10,117,899 B2 | 11/2018 | Genovese et al. |
| 10,155,011 B2 | 12/2018 | Bonini et al. |
| 10,260,062 B2 | 4/2019 | Ainley et al. |
| 2008/0131962 A1 | 6/2008 | Miller |
| 2014/0120622 A1 | 5/2014 | Gregory et al. |
| 2014/0301990 A1 | 10/2014 | Gregory et al. |
| 2015/0016495 A1 | 1/2015 | Ranjan et al. |

(Continued)

FOREIGN PATENT DOCUMENTS

| | | |
|---|---|---|
| EP | 3784689 | 10/2019 |
| WO | 2015/089077 | 6/2015 |

(Continued)

OTHER PUBLICATIONS

Jackson Lab (FoxP3[EGFP], 2015, pp. 1-2.*
Jabalameli et al., Zinc finger nuclease technology: Advances and obstacles in modelling and treating genetic disorders, Gene, 2015, pp. 1-5.*
Fontenot et al., "Regulatory T cell lineage specification by the forkhead transcription factor Foxp3," Immunity (2005) 22(3):329-41.
Fransson et al., "CAR/FoxP3-engineered T regulatory cells target the CNS and suppress EAE upon intranasal delivery," Journal of Neuroinflammation (2012) 9(1):112.
Sharma et al., "In vivo genome editing of the albumin locus as a platform for protein replacement therapy," Blood (2015) 126(15): 1777-784.

(Continued)

*Primary Examiner* — Maria Marvich
(74) *Attorney, Agent, or Firm* — ROTHWELL, FIGG, ERNST & MANBECK, P.C.

(57) ABSTRACT

The present disclosure provides mammalian cells such as regulatory T cells containing a transgene in the FOXP3 genomic locus. Also provided are methods of generating the cells and methods of using the cells to treat patients in need of immunosuppression.

25 Claims, 12 Drawing Sheets

Specification includes a Sequence Listing.

(56) References Cited

U.S. PATENT DOCUMENTS

| | | | |
|---|---|---|---|
| 2015/0132269 A1 | 5/2015 | Orkin et al. | |
| 2017/0233765 A1* | 8/2017 | Kay | C12N 9/22 |
| | | | 435/462 |
| 2018/0087072 A1 | 3/2018 | Miller et al. | |
| 2019/0290691 A1* | 9/2019 | Jäckel | C12N 15/85 |
| 2021/0054376 A1* | 2/2021 | Rawlings | A61K 35/15 |
| 2022/0064253 A1* | 3/2022 | Ichinohe | C12N 9/22 |

FOREIGN PATENT DOCUMENTS

| | | |
|---|---|---|
| WO | 2018/132479 | 7/2018 |
| WO | 2019/079034 | 4/2019 |
| WO | 2019/094847 A1 | 5/2019 |
| WO | 2019/210042 A1 | 10/2019 |
| WO | 2019/210078 A1 † | 10/2019 |

OTHER PUBLICATIONS

Bending, et al., "From stability to dynamics: understanding molecular mechanisms of regulatory T cells through Foxp3 transcriptional dynamics," Clinical and Experimental Immunology (2018) 1-10.
Biswas, et al., "Gene therapy with regulatory T cells: a beneficial alliance," Frontiers in Immunology (2018) 9(554):1-13.
Corthay, "How do regulatory T cells work?," Scandinavian Journal of Immunology (2009) 70:326-36.
Mailer, "Alternative splicing of FOXP3—virtue and vice," Frontiers in Immunology (2018) 9(530) 1-11.
Shaban, et al., "Targeting regulatory t cells for transplant tolerance: new insights and future perspectives," Kidney Diseases (2018) 4:205-13.
Watkins, et al., "The isolation and characterisation of human monoclonal HLA-A2 antibodies froman immune V gene phage display library," Tissue Antigens (2000) 55:219-28.
Yu, et al., "Recent advances in CD8+ regulatory T cell research (review)," Oncology Letters (2018) 15:8187-194.
Zhang, et al., "Chimeric antigen receptor (CAR) Treg: a promising approach to inducing immunological tolerance," Frontiers in Immunology (2018) 9(2359):1-8.
Romano et al., "Past, present, and future of regulatory t cell therapy in transplantation and autoimmunity," Front Imm. (2019) 10(43):1-14.
Dominguez-Villar, et al., "Regulatory T cells in autoimmune disease," Nat Immunol. (2018) 19: 665-73.
Sadlon et al., "Unravelling the molecular basis for regulatory T-cell plasticity and loss of function in disease," Clin Transl Imm. (2018) 7:e1011, doi: 10-1002/cti2.1011.
McGovern et al., "Engineering specificity and function of therapeutic regulatory T cells," Front Imm. (2017) 8(1517):1-6.
Boardman et al., "Expression of a chimeric antigen receptor specific for donor HLA class I enhances the potency of human regulatory T cells in preventing human skin transplant rejection," Am J Transpl. (2017) 17:931-43.

Dawson et al., "Systematic testing and specificity mapping of alloantigen-specific chimeric antigen receptors in regulatory T cells," JCI Insight. (2019) 4(6):e123672.
MacDonald et al., "Alloantigen-specific regulatory T cells generated with a himeric antigen receptor," J Clin Invest. (2016) 126(4):1413-24.
Iriguchi, et al., "Toward the development of true 'off-the-shelf' synthetic T-cell immunotherapy," Cancer Sci. (2019) 110:16-22.
Inaba, et al., "Generation of large numbers of dendritic cells from mouse bone marrow cultures supplemented with granulocyte/macrophage colony-stimulating factor," J Exp Med. (1992) 176:1693-702.
MacDonald et al., "Methods to manufacture regulatory T cells for cell therapy," Clin Exp Immunol. (2019) 197:52-63 doi: 10.1111/cei.13297.
Zah et al., "T cells expressing CD19/CD20 bispecific chimeric antigen receptors prevent antigen escape by malignant B cells," Cancer Immunol Res. (2016) 4(6):498-508.
Chen, et al., "Molecular mechanisms of T cell co-stimulation and co-inhibition," Nat Rev Immunol. (2013) 13(4):227-42.
Zarogoulidis et al., "Suicide gene therapy for cancer—current strategies," J Genet Syndr Gene Ther. (2013) 4(4):1-16 doi:10.4172/2157-7412.1000139.
Urnov et al., "Highly efficient endogenous human gene correction using designed zinc-finger nucleases," Nature (2005) 435:646-51.
Lombardo et al., "Gene editing in human stem cells using zinc finger nucleases and integrase-defective lentiviral vector delivery," Nat Biotechnol. (2007) 25(11):1298-306.
Gaj et al., "ZFN, TALEN, and CRISPR/Cas-based Methods for Genome Engineering," Trends in Biotechnology (2013) 31(7):397-405.
Haribhai et al., "Regulatory T Cells Dynamically Control the Primary Immune Response to Foreign Antigen," The Journal of Immunology (2007) 178(5):2961-72.
Wan, et al., "Identifying Foxp3-expressing Suppressor T Cells with a Bicistronic Reporter," PNAS (2005) 102(14):5126-31.
Ogino et al., "Standard Mutation Nomenclature in Molecular Diagnostics," Journal of Molecular Diagnostics, Feb. 2007, vol. 9, No. 1, pp. 1-6, American Society for Investigative Pathology and the Association for Molecular Pathology, Rockville, MD, DOI: 10.2353/jmoldx.2007.060081.
Haribhai et al., "Regulatory T Cells Dynamically Control the Primary Immune Response to Foreign Antigen," The Journal of Immunology, Mar. 1, 2007, vol. 178, No. 5, pp. 2961-2972, The American Association of Immunologists, Inc., Baltimore, MD, DOI: 10.4049/jimmunol.
Eyquem J. et al., Targeting a CAR to the TRAC locus with CRISPR/Cas9 enhances tumor rejection. Nature, vol. 543, Issue No. 7643, pp. 113-117 (Mar. 2017).†

\* cited by examiner
† cited by third party

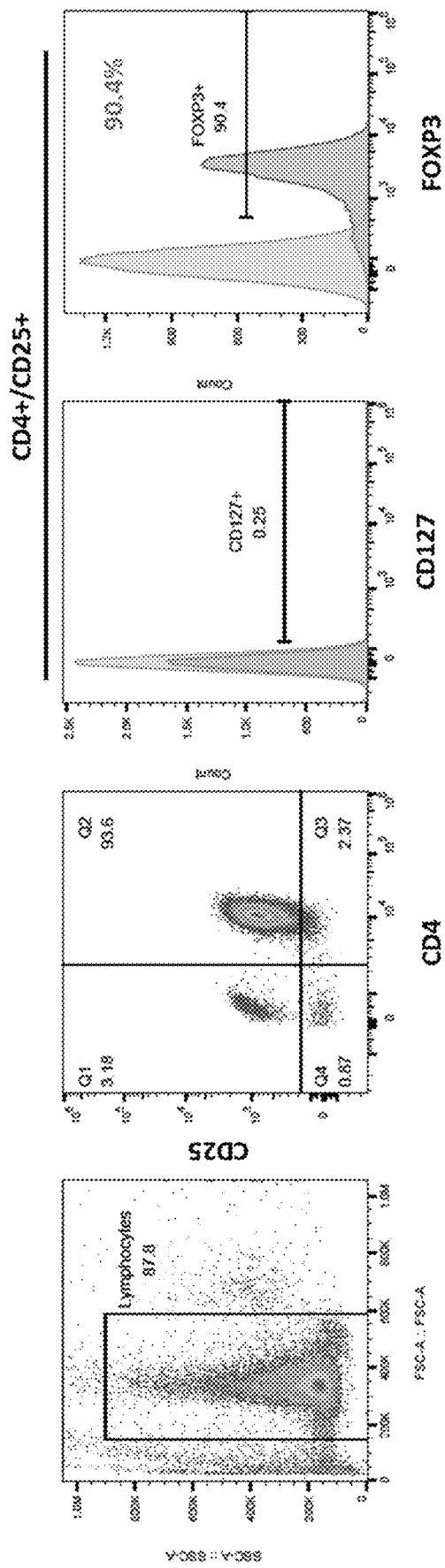

| FOXP3 Site | Sample | Dose (mRNA per ZFP) (ug/mL) | Indels (%) | TI (%) | Total Editing (%) |
|---|---|---|---|---|---|
| A | 75591/75592 | 20 | 37.3 | 60.7 | 98.0 |
| A | Donor only | | 0.4 | 3.1 | 3.5 |
| A | GFP | | 0.1 | 0.0 | 0.1 |
| B | 75683/75684 | 20 | 60.1 | 31.8 | 92.0 |
| B | Donor only | | 0.8 | 1.0 | 1.7 |
| B | GFP | | 0.4 | 0.0 | 0.4 |
| C | 75714/75715 | 20 | 54.7 | 36.0 | 90.7 |
| C | Donor only | | 0.4 | 0.6 | 1.0 |
| C | GFP | | 0.5 | 0.0 | 0.5 |
| D | 75806/75808 | 20 | 42.9 | 46.7 | 89.5 |
| D | Donor only | | 1.0 | 1.5 | 2.5 |
| D | GFP | | 0.7 | 0.0 | 0.7 |
| E | 75893/75895 | 20 | 52.1 | 43.0 | 95.0 |
| E | Donor only | | 0.2 | 4.0 | 4.2 |
| E | GFP | | 0.8 | 0.0 | 0.8 |
| F | 76695/76698 | 20 | 47.9 | 46.7 | 94.5 |
| F | Donor only | | 0.2 | 0.0 | 0.2 |
| F | GFP | | 0.2 | 0.0 | 0.2 |

FIG. 2D

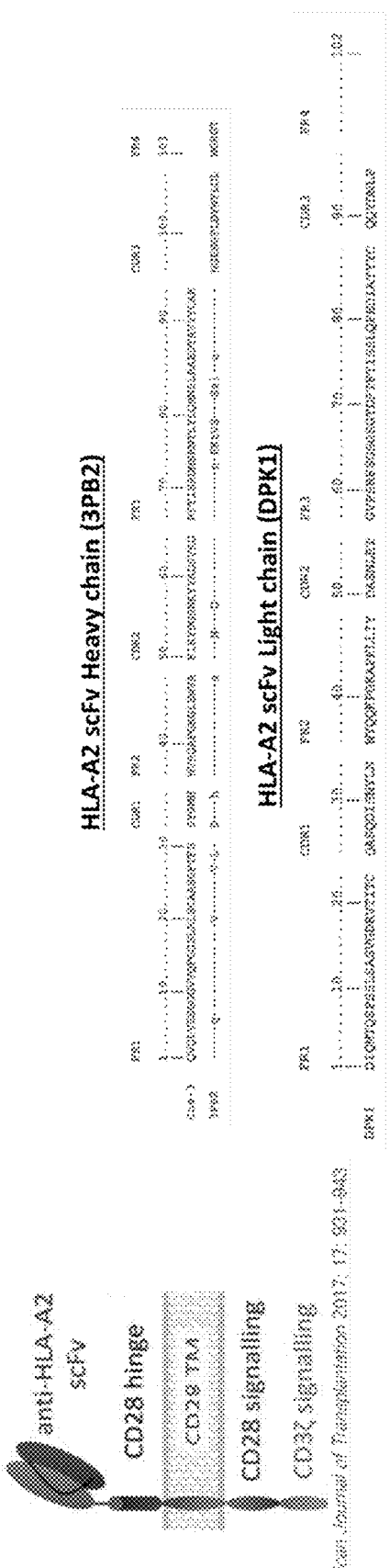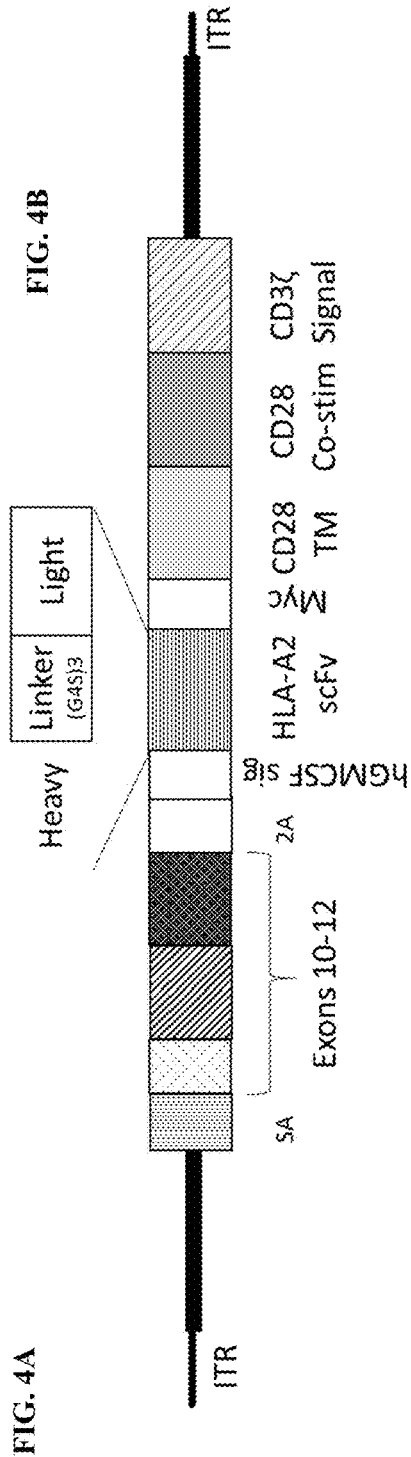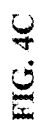
FIG. 4A
FIG. 4B
FIG. 4C

CONTROLLED TRANSGENE EXPRESSION IN REGULATORY T CELLS

CROSS REFERENCE TO RELATED APPLICATION

The present application claims priority from U.S. Provisional Application 62/850,963, filed May 21, 2019, the disclosure of which is incorporated herein by reference in its entirety.

SEQUENCE LISTING

The instant application contains a Sequence Listing which has been submitted electronically in ASCII format and is hereby incorporated by reference in its entirety. Said ASCII copy, created on May 20, 2020, is named 025297_US006_SL.txt and is 31,037 bytes in size.

BACKGROUND OF THE INVENTION

A healthy immune system is one that is in balance. Cells involved in adaptive immunity include B and T lymphocytes. There are two general types of T lymphocytes—effector T (Teff) cells and regulatory T (Treg) cells. Teff cells include $CD4^+$ T helper cells and $CD8^+$ cytotoxic T cells. Teff cells play a central role in cellular-mediated immunity following antigen challenge. A key regulator of the Teff cells and other immune cells is the Treg cells, which prevent excessive immune responses and autoimmunity (see, e.g., Romano et al., *Front Imm.* (2019) 10, art. 43).

Some Tregs are generated in the thymus; they are known as natural Treg (nTreg) or thymic Treg (tTreg). Other Tregs are generated in the periphery following antigen encounter or in cell culture, and are known as induced Tregs (iTreg) or adaptive Tregs. Tregs actively control the proliferation and activation of other immune cells, including inducing tolerance, through cell-to-cell contact involving specific cell surface receptors and the secretion of inhibitory cytokines such as IL-10, TGF-β and IL-35 (Dominguez-Villar and Hafler, *Nat Immunol*. (2018) 19: 665-673). Failure of tolerance can lead to autoimmunity and chronic inflammation. Loss of tolerance can be caused by defects in Treg functions or insufficient Treg numbers, or by unresponsive or overactivated Teff (Sadlon et al., *Clin Transl Imm*. (2018) 7:e1011, doi:10-1002/cti2.1011).

In recent years, there has been much interest in the use of Tregs to treat diseases. A number of approaches, including adoptive cell therapy, have been explored to boost Treg numbers and functions in order to treat autoimmune diseases. Treg transfer (delivering an activated and expanded population of Tregs) has been tested in patients with autoimmune diseases such as type I diabetes, cutaneous lupus erythematosus, and Crohn's disease (Dominguez-Villar, supra). However, these cell populations are polyclonal in nature and thus may not be as effective as hoped. There also is evidence that simply increasing the number of Tregs may not be sufficient to control disease (McGovern et al., *Front Imm*. (2017) 8, art. 1517).

Thus, there remains a need for effective cell therapy that can treat diseases associated with unwanted proliferation and activation of Teff cells.

SUMMARY OF THE INVENTION

The present disclosure provides a genetically engineered mammalian cell (e.g., a human cell) comprising a heterologous sequence in a FOXP3 locus in the genome, wherein the heterologous sequence comprises a transgene, wherein the transgene is under the transcriptional control of a FOXP3 promoter in the FOXP3 locus; and when the promoter is activated, the cell expresses both FOXP3 and a product of the transgene from the locus.

In another aspect, the present disclosure provides a method of making a genetically engineered mammalian cell (e.g., a human cell), comprising contacting a mammalian cell with a nucleic acid construct comprising (i) a heterologous sequence and (ii) a first homologous region (HR) and a second HR flanking the heterologous sequence, wherein the heterologous sequence comprises a transgene, the first and second HRs are homologous to a first genomic region (GR) and a second GR, respectively, in a FOXP3 locus in the mammalian cell; and culturing the cell under conditions that allow integration of the heterologous sequence between the first and second GRs in the FOXP3 locus. In some embodiments, the integration is facilitated by a zinc finger nuclease or nickase (ZFN), a transcription activator-like effector domain nuclease or nickase (TALEN), a meganuclease, an integrase, a recombinase, a transposase, or a CRISPR/Cas system. In some embodiments, the nucleic acid construct is a lentiviral construct, an adenoviral construct, an adeno-associated viral construct, a plasmid, a DNA construct, or an RNA construct.

In some embodiments of the present disclosure, the heterologous sequence comprises (i) an internal ribosome entry site (IRES) immediately upstream of the transgene, or (ii) a coding sequence for a self-cleaving peptide immediately upstream of and in-frame with the transgene. The self-cleaving peptide may be, for example, a 2A peptide, where the 2A peptide is optionally selected from the group consisting of a P2A peptide, an E2A peptide, a F2A peptide, and a T2A peptide.

In some embodiments, the heterologous sequence is inserted into a FOXP3 intron (e.g., intron 4, 9, or 10) upstream of one or more FOXP3 exons, wherein the heterologous sequence comprises (i) a nucleotide sequence coding for the one or more FOXP3 exons, and (ii) a splice acceptor upstream of the nucleotide sequence to allow expression of a full-length FOXP3 mRNA transcript from the locus, and the nucleotide sequence is (a) immediately upstream of the IRES, or (b) immediately upstream of and in-frame with the coding sequence for the self-cleaving peptide.

In some embodiments, the transgene product is a chimeric antigen receptor (CAR) or a T-cell receptor (TCR). The CAR or TCR may be specific for, e.g., (i) an autoantigen, (ii) a B cell antigen optionally selected from CD19 and CD20, or (iii) an allogeneic HLA class I molecule, wherein the class I molecule is optionally HLA-A2. In particular embodiments, the transgene product is a CAR specific for allogeneic HLA-A2 and comprises, from N-terminus to C-terminus, (i) a scFV comprising a heavy chain variable domain (VH) and a light chain variable domain (VL), wherein the VH comprises HCDR1-3 comprising SEQ ID NOs: 1-3, respectively, and VL comprises LCDR1-3 comprising SEQ ID NOs: 5-7, or the VH and VL comprise SEQ ID NOs: 4 and 10, respectively; (ii) a transmembrane (TM) domain and a co-stimulation domain derived from CD28, CD4, or 4-1BB; and (iii) an intracellular CD3 signaling sequence.

In other embodiments, the transgene product is a cytokine, a chemokine, a growth factor, or a signaling factor; or an AAV capsid protein selected from VP1, VP2, or VP3.

In some embodiments, the engineered cell is a lymphoid cell (e.g., a Treg cell), a lymphoid progenitor cell, a mesenchymal stem cell, a hematopoietic stem cell, an induced pluripotent stem cell, or an embryonic stem cell. In preferred embodiments, the engineered cell is a human cell. In some embodiments, the cell comprises a null mutation in a gene selected from a T cell receptor alpha or beta chain gene, a Class II major histocompatibility complex transactivator (CIITA) gene, a transporter associated with antigen processing (e.g., TAP-1 or TAP-2), an HLA Class I or II gene, a minor histocompatibility antigen gene, and a β2-microglobulin (B2M) gene.

In some embodiments, the cell comprises a suicide gene optionally selected from a HSV-TK gene, a cytosine deaminase gene, a nitroreductase gene, a cytochrome P450 gene, or a caspase-9 gene.

In other aspects, the present disclosure provides a method of treating a patient in need of immunosuppression, comprising administering to the patient the present engineered cell; use of the cell in the manufacture of a medicament in treating a patient in need of immunosuppression; and the engineered cell for use in treating a patient in need of immunosuppression. In some embodiments, the patient has an autoimmune disease. In some embodiments, the patient has received or will receive tissue transplantation. In preferred embodiments, the patient is a human.

BRIEF DESCRIPTION OF THE DRAWINGS

FIGS. 1A-D are fluorescence activating cell sorting (FACS) plots analyzing Treg cells isolated from a healthy human volunteer.

FIG. 2D is a table showing the level of allelic genome modification as assessed by MiSeq next generation sequencing in T cells modified at different sites in the FOXP3 locus using the general scheme shown in FIGS. 2A and 2B. For each targeted site A, B, C, D, E, or F, three T cell samples were tested: T cells treated with ZFN and the donor construct (first row), T cells treated with only the donor construct (second row), and T cells treated with GFP mRNA (third row).

FIGS. 4A-C depict an AAV-based donor construct containing a chimeric antigen receptor (CAR) specific for human MHC class I molecule HLA-A2. FIG. 4A: a schematic diagram of an HLA-A2 CAR with an anti-HLA-A2 scFv; CD28 hinge, transmembrane (TM) and signaling (co-stimulatory) domains; and a CD3ζ signaling domain (Boardman et al., *Am J Transpl.* (2017) 17:931-43). FIG. 4B: VH and VL amino acid sequences of the HLA-A2 scFv in the CAR (SEQ ID NOs: 95, 4 and 10, respectively, in order of appearance). Id. FIG. 4C: a schematic diagram of the AAV donor construct, in which the VH and VL of the HLA-A2 scFv is linked by a $[G_4S]_3$ peptide linker (SEQ ID NO: 90). SA: splice acceptor. Exons 10-12: exons 10-12 of FOXP3. 2A: 2A self-cleaving peptide. hGMCSF sig: human GM-CSF signal peptide. Myc: myc tag. TM: transmembrane domain. Co-stim: costimulatory domain. Signal: signaling domain. ITR: Inverted Terminal Repeat of the AAV.

FIG. 7A: unedited cells (cells treated with the AAV donor construct alone).

DETAILED DESCRIPTION OF THE INVENTION

Figure 2A:
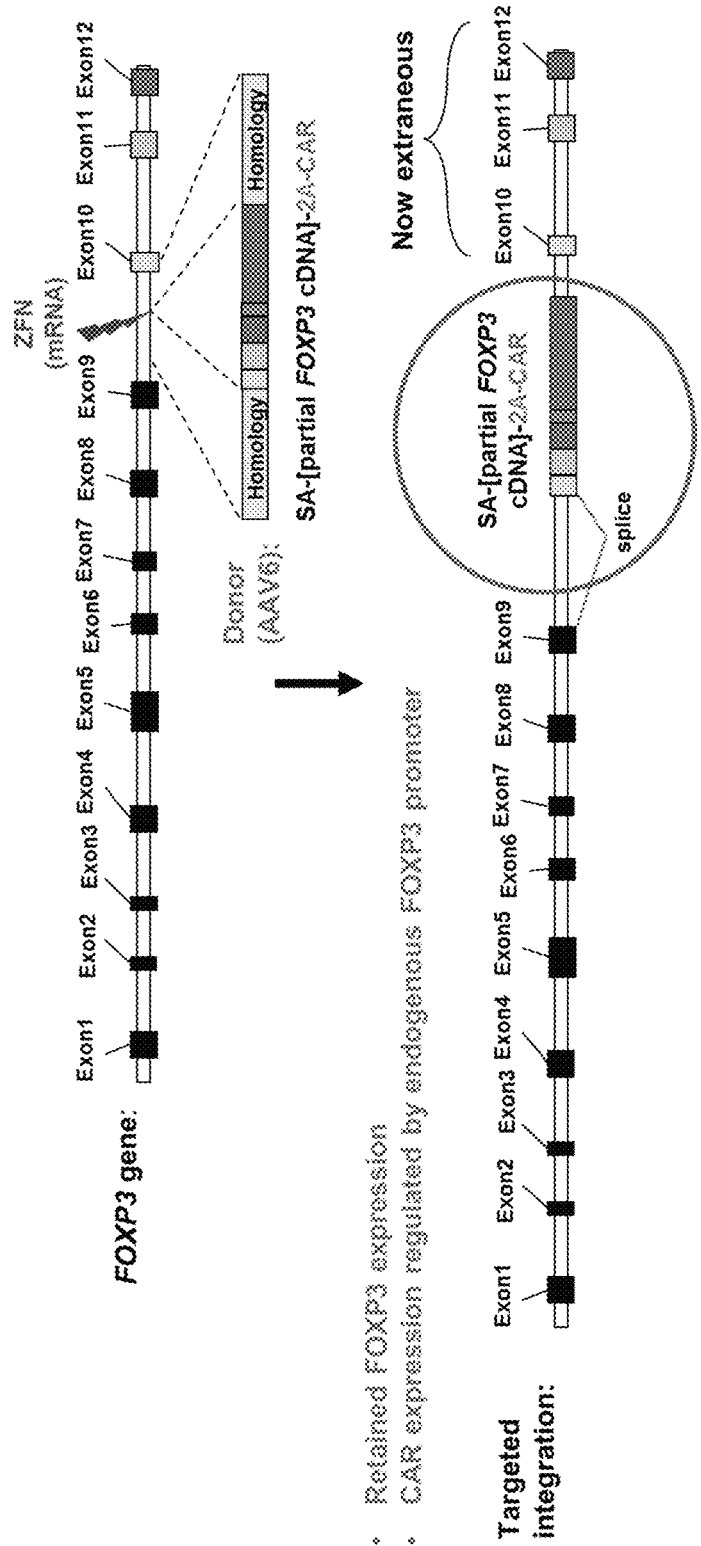
FIG. 2A is a schematic diagram depicting a genome editing approach to integrating a chimeric antigen receptor (CAR) coding sequence into intron 9 of the human FOXP3 gene. A zinc finger nuclease (ZFN) produced from an introduced mRNA makes a double-stranded break at a specific site (lightning bolt) in intron 9. The donor sequence, introduced by an adeno-associated virus (AAV) 6 vector, contains, from 5' to 3', homology region 1, a splice acceptor (SA), the sequences of FOXP3 exons 10-12, a coding sequence for self-cleaving peptide 2A, a CAR coding sequence, and homology region 2. The homology regions are homologous to the genomic regions flanking the ZFN cleavage site. The FOXP3 exons, the 2A coding sequence and the CAR coding sequences are in-frame with each other.

The present disclosure provides genetically engineered regulatory T (Treg) cells containing a heterologous sequence (e.g., a transgene) in an endogenous genomic FOXP3 locus, where the heterologous sequence can be transcribed into RNA under the control of the FOXP3 transcription regulatory elements such as the FOXP3 promoter. High FOXP3 expression level is a specific phenotype for Treg cells. As a result, the heterologous sequence is transcribed actively, together with the FOXP3 gene, in Treg cells and the heterologous sequence is expressed only as long as the cell maintains its Treg, FOXP3+ phenotype. The present disclosure also provides methods for making and using the genetically engineered Treg cells.

Regulatory T cells maintain immune homeostasis and confer immune tolerance. The engineered Treg cells, which may be autologous or allogeneic, can be used in cell-based therapy to treat patients in need of induction of immune tolerance or restoration of immune homeostasis, such as patients receiving organ transplantation or allogeneic cell therapy and patients with an autoimmune disease. The present Treg cells will have enhanced immune-regulatory activities, including improved tissue-specificity (e.g., through expression of an edited-in receptor specific for an antigen in a targeted tissue) and/or increased immunosuppressive functions (e.g., through secretion of an edited-in immunomodulatory molecule). The Tregs will actively control the proliferation and activation of T effector cells locally and/or systemically through receptor-mediated cell-to-cell contact and secretion of immunosuppressive cytokines (e.g., IL-10, TGF-β and IL-35).

Since the engrafted Tregs can proliferate and self-renew, the present cell therapy can achieve long-term tolerance and protection of the transplant. See, e.g., Dawson et al., *JCI Insight*. (2019) 4(6):e123672, which is incorporated herein by reference in its entirety.

The Treg cells will also have the safety feature that the heterologous sequence will be expressed only as long as the Treg cells maintain their Treg phenotype. Once the cell loses FOXP3 gene expression, the heterologous sequence will no longer be transcribed.

I. Cells Used for FOXP3 Genome Editing

The engineered cells of the present disclosure are mammalian cells, such as human cells, cells from a farm animal (e.g., a cow, a pig, or a horse), and cells from a pet (e.g., a cat or a dog). The genome editing described may be performed on Treg cells, or on cells that are not Treg cells but are differentiated into Treg cells after the genome editing. The Treg phenotype is in part dependent on the expression of the master transcription factor forkhead box P3 (FOXP3), which regulates the expression of a network of genes essential for immune suppressive functions.

As used herein, the terms "regulatory T cells," "regulatory T lymphocytes," and Tregs refers to a subpopulation of T cells that modulates the immune system, maintains tolerance to self-antigens, and generally suppresses or downregulates induction and proliferation of T effector cells. Tregs often are marked by the phenotype of $CD4^+CD25^+CD127^{lo}FOXP3^+$. In some embodiments, Tregs are also $CD45RA^+$, $CD62L^{hi}$, and/or $GITR^+$. In particular embodiments, Tregs are marked by $CD4^+CD25^+CD127^{lo}CD62L^+$ or $CD4^+CD45RA^+CD25^{hi}CD127^{lo}$. As used herein, Tregs include (i) "natural" Tregs that develop in the thymus; (ii) induced, adaptive, or peripheral Tregs arising via a differentiation process that takes place outside the thymus (e.g., in tissues or secondary lymphoid organs, or in laboratory settings under defined culture conditions); and (iii) Tregs that have been created using recombinant DNA technology, including genome editing and gene therapy.

1. Isolation of Treg Cells for Genome Editing

The Treg cells on which the genome editing is performed may be isolated from a number of sources, including peripheral blood mononuclear cells (PBMC), bone marrow, lymph node tissue, cord blood, thymus tissue, or spleen tissue. For example, Tregs may be isolated from a unit of blood collected from a subject using well known techniques such as Ficoll™ separation, centrifugation through a PERCOLL™ gradient following red blood cell lysis and monocyte depletion, counterflow centrifugal elutriation, leukapheresis, and subsequent cell surface marker-based magnetic or flow cytometric isolation.

Further enrichment of Treg cells from the isolated white blood cells can be accomplished by positive and/or negative selection with a combination of antibodies directed to unique surface markers using techniques such as flow cytometry cell sorting and/or magnetic immunoadherence involving conjugated beads. For example, to enrich for $CD4^+$ cells by negative selection, a monoclonal antibody cocktail typically may include antibodies to CD14, CD20, CD11b, CD16, HLA-DR, and CD8. To enrich or positively select for Tregs, antibodies to CD4, CD25, CD45RA, CD62L, GITR, and/or CD127 can be used.

In an exemplary and nonlimiting protocol, Treg cells may be obtained as follows (see Dawson et al., *JCI Insight*. (2019) 4(6):e123672). $CD4^+$ T cells are isolated from a human donor via RosetteSep™ (STEMCELL Technologies, 15062) and enriched for $CD25^+$ cells (Miltenyi Biotec, 130-092-983) prior to sorting live $CD4^+CD25^{hi}CD127^{lo}$ Tregs or $CD4^+CD127^{lo}CD25^{hi}CD45RA^+$Tregs using a MoFlo® Astrios™ (Beckman Coulter) or FACSAria™ II (BD Biosciences). Sorted Tregs may be stimulated with L cells and anti-CD3 monoclonal antibody (e.g., OKT3, UBC AbLab; 100 ng/ml) in ImmunoCult™-XF T cell expansion media (STEMCELL Technologies, 10981) with 1000 U/ml IL-2 (Proleukin) as described in MacDonald et al., *J Clin Invest*. (2016) 126(4):1413-24). One or more days later, the Treg cells may be genome-edited as described below. For phenotypic analysis, cells may be stained with fixable viability dye (FVD, Thermo Fisher Scientific, 65-0865-14; BioLegend, 423102) and for surface markers before fixation and permeabilization using an eBioscience FOXP3/Transcription Factor Staining Buffer Set (Thermo Fisher Scientific, 00-5523-00) and staining for intracellular proteins. Samples were read on a CytoFLEX (Beckman Coulter).

Tregs may also be derived from T effector cells in vitro, for example, by exposure to IL-10 or TGF-β.

2. Isolation of Non-Treg Cells for Genome Editing

The source cells, i.e., cells on which the genome editing is performed, may also be pluripotent stem cells (PSCs). PSCs are cells capable to giving rise to any cell type in the body and include, for example, embryonic stem cells (ESCs), PSCs derived by somatic cell nuclear transfer, and induced PSCs (iPSCs). See, e.g., Iriguchi and Kaneko, *Cancer Sci*. (2019) 110(1):16-22 for differentiating iPSCs to T cells. As used herein, the term "embryonic stem cells" refers to pluripotent stem cells obtained from early embryos; in some embodiments, this term refers to ESCs obtained from a previously established embryonic stem cell line and excludes stem cells obtained by recent destruction of a human embryo.

In other embodiments, the source cells for genome editing are multipotent cells such as hematopoietic stem cell (HSCs such as those isolated from bone marrow or cord blood), hematopoietic progenitor cells (e.g., lymphoid progenitor cell), or mesenchymal stem cells (MSC). Multipotent cells are capable of developing into more than one cell type, but are more limited than cell type potential than pluripotent cells. The multipotent cells may be derived from established cell lines or isolated from human bone marrow or umbilical cords. By way of example, the HSCs may be isolated from a patient or a healthy donor following G-CSF-induced mobilization, plerixafor-induced mobilization, or a combination thereof. To isolate HSCs from the blood or bone marrow, the cells in the blood or bone marrow may be panned by antibodies that bind unwanted cells, such as antibodies to CD4 and CD8 (T cells), CD45 (B cells), GR-1 (granulocytes), and Tad (differentiated antigen-presenting cells) (see, e.g., Inaba, et al. (1992) *J Exp Med*. 176:1693-1702). HSCs can then be positively selected by antibodies to CD34.

In still other embodiments, the source cells for genome editing are non-Treg lymphoid cells that are differentiated into Treg cells after genome editing. See above for how to differentiate T effector cells into Treg cells.

The edited non-Treg cells may be differentiated into Treg cells before engrafting into a patient as described above. Alternatively, the edited non-Treg cells may be induced to differentiate into Treg cells after engrafting to a patient.

3. Additional Genome Editing

The present engineered cells may be further genetically engineered, before or after the FOXP3 genome editing, to make the cells more effective, more useable on a larger patient population, and/or safer.

In some embodiments, the present FOXP3-edited cells may be allogeneic cells to the patient. In such instances, the cells may be engineered to reduce host rejection to these cells (graft rejection) and/or these cells' potential attack on the host (graft-versus-host disease). By way of example, the cells may be engineered to have a null genotype for one or more of the following: (i) T cell receptor (TCR alpha chain or beta chain); (ii) a polymorphic major histocompatibility complex (MHC) class I or II molecule (e.g., HLA-A, HLA-B, or HLA-C; HLA-DP, HLA-DM, HLA-DOA, HLA-DOB, HLA-DQ, or HLA-DR; or β2-microglobulin (B2M)); (iii) a transporter associated with antigen processing (e.g., TAP-1 or TAP-2); (iv) Class II MHC transactivator (CIITA); (v) a minor histocompatibility antigen (MiHA; e.g., HA-1/A2, HA-2, HA-3, HA-8, HB-1H, or HB-1Y); and (vi) any combination thereof. The allogeneic engineered cells may also express an invariant HLA or CD47 to protect the engineered Treg cells from host rejection. These further genetic modifications may be performed by the gene editing techniques known in the art and those described herein.

The further-edited allogeneic cells are particularly useful because they can be used in multiple patients without compatibility issues. The allogeneic cells thus can be called "universal" and can be used "off the shelf" The use of "universal" cells greatly improves the efficiency and reduces the costs of adopted cell therapy.

In some embodiments, the present FOXP3-edited engineered cells are engineered to include a safety switch such as a suicide gene as further discussed below.

4. Maintenance of Treg Phenotype

Plasticity is a property inherent to nearly all types of immune cells. It appears that Treg cells are able to transition ("drift") to Teff cells under inflammatory and environmental conditions (Sadlon et al., *Clin Transl Imm.* (2018) 7(2):e1011). To maintain the Treg phenotype and/or to increase expression of FOXP3 and the transgene in the engineered Treg cells, the cells may be cultured in tissue culture media containing rapamycin and/or a high concentration of IL-2. See, e.g., MacDonald et al., *Clin Exp Immunol.* (2019) doi: 10.1111/cei.13297.

II. Transgenes for Insertion into the FOXP3 Locus

The engineered cells of the present disclosure comprise a heterologous sequence integrated in either or both of their endogenous FOXP3 gene loci. The term "heterologous" here means that the sequence is inserted into a site of the genome where this sequence does not naturally occur. The heterologous sequence may contain a transgene and may contain additional sequences from the genome, such as FOXP3 sequences (see, e.g., FIGS. 2A and 2B). A transgene integrated into the FOXP3 locus is co-expressed with FOXP3 but is no longer expressed when the cell loses its Treg, FOXP3$^+$ phenotype. The transgene may encode a protein that enhances the Treg cells' therapeutic efficacy or provides a separate therapeutic benefit. The following are non-limiting examples of transgenes that may be expressed by the engineered Treg cells of the present disclosure.

1. Soluble Polypeptides

Examples of transgenes useful herein are those encoding cytokines (e.g., IL-10), chemokines (e.g., CCR7), growth factors (e.g., remyelination factors for treatment of multiple sclerosis), and signaling factors (e.g., amphiregulin).

2. Antigen-Binding Receptors

Other examples of transgenes useful herein are those encoding a T cell receptor (TCR) of interest or a chimeric antigen receptor (CAR) such that the engineered Tregs are specific to an antigen of interest.

A CAR is a fusion protein designed to target T cells expressing it to a desired antigen. In its most basic form, a CAR comprises an extracellular antigen-binding domain and a series of customized intracellular TCR costimulatory/signaling domains. Once the CAR binds to its antigen, it activates the cell expressing it, as a natural TCR would. Antigen-specific engineered Tregs enable enhanced immune suppression by homing to the targeted tissue (e.g., a transplant or a site of autoimmune inflammation). They can interact Teff cells specific for an allo-antigen (in cases of transplantation) or an autoantigen (in cases of autoimmune disease). CARs offer the advantage that, unlike natural TCRs, they bind to antigens without the need to interact with other co-stimulatory molecules or involvement of MHC class I or II molecules, thereby affording them functionality in broader settings.

Tregs can functionally switch to effector-like T cells under certain circumstances (Sadlon, supra). Due to the antigen-specific clonality of the engineered CAR or TCR Tregs, functional switching to an effector-like state could induce unintended cytotoxicity, leading to exacerbated pathology. The present engineered Tregs avoid this potential problem because the CAR or TCR is only expressed while the T cells maintain their Treg (FOXP3$^+$) phenotype.

A. Antigen-Binding Domains of CARs

The antigen-binding domain of a CAR may comprise an antibody fragment such as an scFv, a Fv, a Fab, a (Fab')$_2$, a single domain antibody (SDAB), a VH or VL domain, or a camelid VHH domain.

In some embodiments, the CAR is specific for a polymorphic allogeneic MHC molecule, such as one expressed by cells in a solid organ transplant or by cells in a cell-based therapy (e.g., bone marrow transplant, cancer CAR T therapy, or cell-based regenerative therapy). MHC molecules so targeted include, without limitation, HLA-A, HLA-B, or HLA-C; HLA-DP, HLA-DM, HLA-DOA, HLA-DOB, HLA-DQ, or HLA-DR. By way of example, the CAR targets class I molecule HLA-A2. HLA-A2 is a commonly mismatched histocompatibility antigen in transplantation. HLA-A mismatching is associated with poor outcomes after transplantation. Engineered Tregs expressing a CAR specific for an MHC class I molecule are advantageous because MHC class I molecules are broadly expressed on all tissues, so the Tregs can be used for organ transplantation regardless of the tissue type of the transplant. CAR against HLA-A2 offers the additional advantage that HLA-A2 is expressed by a substantial proportion of the human population and therefore on many donor organs. There has been evidence showing that expression of an HLA-A2 CAR in Treg cells can enhance the potency of the Treg cells in preventing transplant rejection (see, e.g., Boardman, supra; MacDonald et al., *J Clin Invest.* (2016) 126(4):1413-24; and Dawson, supra).

In some embodiments, the CAR is specific for an autoantigen, i.e., an endogenous antigen expressed prevalently or uniquely at the site of autoimmune inflammation in a specific tissue of the body. Tregs expressing such a CAR can home to the inflamed tissue and exert tissue-specific activity by causing local immunosuppression. Examples of autoantigens are aquaporin water channels (e.g., aquaporin-4 water channel), paraneoplastic antigen Ma2, amphiphysin, voltage-gated potassium channel, N-methyl-d-aspartate receptor (NMDAR), a-amino-3-hydroxy-5-methyl-4-isoxazolepropionic acid receptor (AMPAR), thyroid peroxidase, thyroglobulin, anti-N-methyl-D-aspartate receptor (NR1 subunit), Rh blood group antigens, desmoglein 1 or 3 (Dsg1/3), BP180, BP230, acetylcholine nicotinic postsynaptic receptors, thyrotropin receptors, platelet integrin, glycoprotein IIb/IIIa, calpastatin, citrullinated proteins, alpha-beta-crystallin, intrinsic factor of gastric parietal cells, phospholipase A2 receptor 1 (PLA2R1), and thrombospondin type 1 domain-containing 7A (THSD7A). Additional examples of autoantigens are multiple sclerosis-associated antigens (e.g., myelin basic protein (MBP), myelin associated glycoprotein (MAG), myelin oligodendrocyte glycoprotein (MOG), proteolipid protein (PLP), oligodendrocyte myelin oligoprotein (OMGP), myelin associated oligodendrocyte basic protein (MOBP), oligodendrocyte specific protein (OSP/Claudin 11), oligodendrocyte specific proteins (OSP), myelin-associated neurite outgrowth inhibitor NOGO A, glycoprotein Po, peripheral myelin protein 22 (PMP22), 2'3'-cyclic nucleotide 3'-phosphodiesterase (CNPase), and fragments thereof); joint-associated antigens (e.g., citrulline-substituted cyclic and linear filaggrin peptides, type II collagen peptides, human cartilage glycoprotein 39 peptides, keratin, vimentin, fibrinogen, and type I, III, IV, and V collagen peptides); and eye-associated antigens (e.g., retinal arrestin, S-arrestin, interphotoreceptor retinoid-binding proteins, beta-crystallin B1, retinal proteins, choroid proteins, and fragments thereof).

In some embodiments, the autoantigen targeted by the Treg cells is IL23-R (for treatment of, e.g., Crohn's disease, inflammatory bowel disease, or rheumatoid arthritis), MOG (for treatment of multiple sclerosis), or MBP (for treatment of multiple sclerosis).

In some embodiments, the TCR or CAR edited into the FOXP3 locus may target other antigens of interest (e.g., B cell markers CD19 and CD20). Additionally, rather than using two separate CAR constructs, the CAR transgene itself may encode a bi-specific CAR capable of recognizing, e.g., both CD19 and CD20 (Zah et al., *Cancer Immunol Res*. (2016) 4(6):498-508).

B. CAR Co-Stimulatory and Stimulatory/Activating Domains

The CAR may comprise one or more transmembrane and intracellular costimulatory and activating domains from one or more immune cell surface molecules. A costimulatory signaling domain can be the transmembrane and/or intracellular portion of a costimulatory molecule on a T cell. A costimulatory molecule on a T cell binds to its ligand on an antigen-presenting cell in concert with the TCR's binding to the antigen on the antigen-presenting cell, and allows the activation (e.g., proliferation and secretion of cytokines) of the antigen-bound T cell. A costimulatory molecule can be represented in the following protein families: TNF receptor proteins, immunoglobulin-like proteins, cytokine receptors, integrins, signaling lymphocytic activation molecules (SLAM proteins), and activating NK cell receptors. Costimulatory domains useful in constructing CARs are well known, including, without limitation, transmembrane and/or intracellular sequences from CD2, CD3 delta, CD3 epsilon, CD3 gamma, CD4, CD7, CD8α, CD8β, CD28, CD137 (4-1BB), TNFR2, and inducible T cell co-stimulator (ICOS). See also, e.g., Chen and Flies, *Nat Rev Immunol*. (2013) 13(4):227-42.

The activating domain of the CAR may be derived from CD3-zeta or CD3-epsilon. The CD3-zeta chain may have the protein sequence provided as GenBank Acc. No. BAG36664.1, or the equivalent residues from a non-human species (e.g., mouse, rodent, monkey, ape and the like). A CD3-zeta activating or stimulatory domain includes the amino acid residues from the cytoplasmic domain of the zeta chain, or functional derivatives thereof, that are sufficient to functionally transmit an initial signal necessary for T cell activation. In one embodiment, the cytoplasmic domain of zeta comprises residues 52 through 164 of GenBank Acc. No. BAG36664.1 or the equivalent residues from a non-human species.

3. Other Transgenes

The transgene inserted in the FOXP3 locus may encode other proteins of interest. For example, the transgene may encode a protein that conditions the patient for other therapies such as gene therapy. By way of example, repeated administration of recombinant AAV in gene therapy for genetic diseases such as hemophilia may elicit anti-AAV immune response in the patient, making the therapy less effective in the long run. Thus, it may be desirable to introduce to the patient receiving AAV gene therapy engineered Tregs that express an antigen-specific receptor (e.g., CAR or TCR) toward an AAV capsid protein such as VP1, VP2, and/or VP3, to induce immune tolerance to these proteins in the patient.

Coding sequences for an epitope tag may be included as part of the transgene to allow monitoring of the gene editing. Epitope tags include, for example, one or more copies of FLAG, His tag, myc tag, Tap tag, HA tag, low-affinity nerve growth factor receptor (LNGFR) and/or its antibody-binding domain as a tag, or any other readily detectable amino acid sequence.

4. Signal Sequences for Surface Expression

In some embodiments, the transgene comprises a coding sequence for a signal or leader peptide to facilitate the surface expression of the transgene. For example, the signal sequence may be one derived from the signal sequence of human GM-CSF or CD8.

III. Constructs Carrying the Transgenes

Any gene editing method for targeted integration of a heterologous sequence into a specific genomic site may be used to introduce the heterologous sequence described herein into the FOXP3 gene locus. In order for the transgene to be co-expressed under the FOXP3 transcription regulatory elements (e.g., the FOXP3 promoter), a heterologous sequence carrying the transgene may contain elements that allow the uninterrupted transcription of an intact FOXP3 transcript despite the integration of the heterologous sequence into the FOXP3 genomic locus.

In some embodiments, the heterologous sequence is integrated into an FOXP3 intron, i.e., upstream of at least one FOXP3 exon. In such embodiments, the heterologous sequence may contain, from 5' to 3', a splice acceptor (SA) sequence, the exon(s) downstream of the heterologous sequence target site, a coding sequence for a self-cleaving peptide, and the transgene. Once integrated, the SA will allow the expression of an RNA transcript encoding an intact (i.e., full-length) FOXP3 polypeptide, the self-cleaving peptide, and the transgene product. Translation of this RNA transcript will yield two separate polypeptide products—the intact FOXP3 polypeptide and the transgene product, due to the self-cleaving nature of the intermediary peptide sequence. Examples of SA sequences are those of the FOXP3 exons and other SA sequences known in the art. Examples of self-cleaving peptides are 2A peptides, which are viral derived peptides with a typical length of 18-22 amino acids. 2A peptides include T2A, P2A, E2A, and F2A. By way of example, P2A is a peptide of 19 amino acids; after the cleavage, a few amino acid residues from the P2A are left on the upstream gene and a proline is left at the beginning of the second gene.

In other embodiments, instead of the coding sequence for the self-cleaving peptide, the heterologous sequence may carry an internal ribosome entry site (IRES) sequence between the coding sequence for the FOXP3 exon(s) and the transgene. The IRES sequence will similarly allow the expression of two separate polypeptide products—the intact FOXP3 polypeptide and the transgene product.

In still other embodiments, the heterologous sequence is integrated further downstream just prior to the stop codon in exon 12 in the FOXP3 locus. In those embodiments, the heterologous sequence may carry a coding sequence for a self-cleaving peptide (as described above) 5' to the transgene, without the need to carry a sequence for any FOXP3 exon. The self-cleaving peptide will allow the expression of a FOXP3 polypeptide in parallel with the transgene product.

In still other embodiments, the heterologous sequence is integrated into a FOXP3 exon. In those embodiments, the heterologous sequence will carry the coding sequence(s) for the FOXP3 exonic sequence(s) downstream of the integration site, including the remaining downstream sequence of the disrupted exon, such that an intact FOXP3 transcript can still be generated from the engineered genomic locus. Also in those embodiments, the heterologous sequence may not need to include an SA, while the FOXP3 sequence and the transgene sequence may be separated by a coding sequence for a self-cleaving peptide or an IRES as described above.

Additional elements may be included in the heterologous sequence. For example, to allow transcription termination, the transgene may include a polyadenylation (polyA) site such as an SV40 polyA site. The heterologous sequence may also include RNA-stabilizing elements such as a Woodchuck Hepatitis Virus Posttranscriptional Regulatory Element (WPRE).

In some embodiments, the heterologous sequence may also comprise a coding sequence for an invariant HLA or CD47 to promote the resistance of the engineered Treg cells (especially those with HLA class I knockout or knockdown) to the host's natural killer and other immune cells involved in anti-graft rejection. The HLA or CD47 coding sequence may be linked to the primary transgene in the heterologous sequence through a coding sequence for a self-cleaving peptide, such that the FOXP3 locus can co-express FOXP3, the transgene product, and the invariant HLA or CD47.

To enhance the precision of site-specific integration of the transgene, a construct carrying the heterologous sequence may contain on either or both of its ends a homology region that is homologous to the targeted genomic site. In some embodiments, the heterologous sequence carries in both of 5' and 3' end regions sequences homologous to the target genomic site, e.g., a site within intron 4, intron 9, or intron 10 of the FOXP3 gene. See, e.g., FIGS. 2A, 2B, and 8. The lengths of the homology regions on the heterologous sequence may be, for example, 50-1,000 base pairs in length. The homology region in the heterologous sequence can be, but need not be, identical to the targeted genomic sequence. For example, the homology region in the heterologous sequence may be at 80 or more percent (e.g., 85 or more, 90 or more, 95 or more, 99 or more percent) homologous or identical to the targeted genomic sequence (e.g., the sequence that is to be replaced by the homology region in the heterologous sequence). In further embodiments, the construct, when linearized, comprise on one end homology region 1, and on its other end homology region 2, where homology regions 1 and 2 are respectively homologous to genomic region 1 and genomic region 2 flanking the integration site in the genome.

Figure 8:
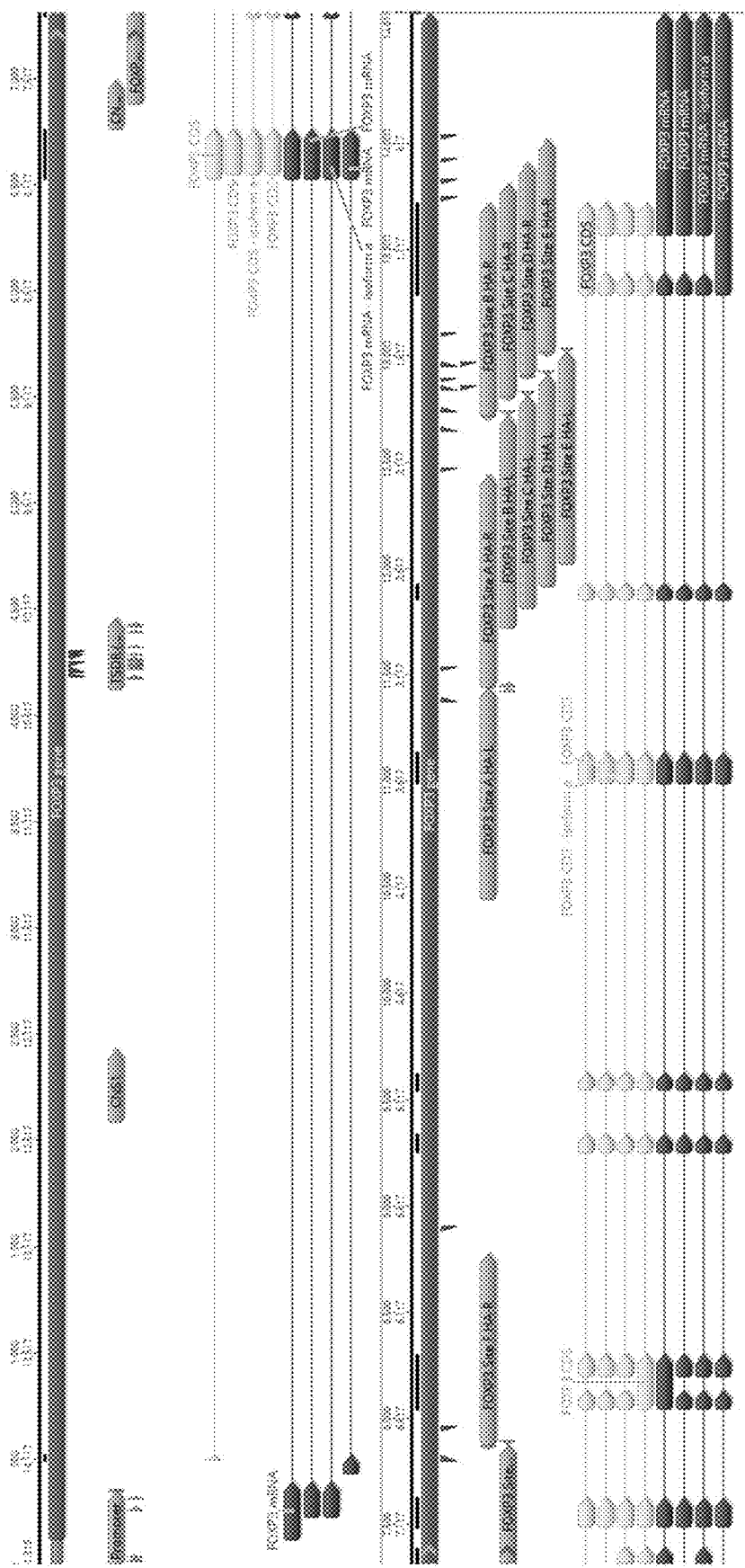
FIG. 8 shows an annotated map of the human FOXP3 gene. The homology arms (HA) flanking each ZFN cleavage site were incorporated into each respective AAV donor to promote homology-directed repair. Regulatory sites within intron 1 (CNS1 & TSDR), intron 2 (CNS2), and the core promoter region are also annotated.

The genomic structure of the FOXP3 locus is illustrated in FIGS. 2A and 8. The gene sequence and the exon/intron boundaries of the human FOXP3 gene can be found in Genbank ID 50943. The targeted site for integration may be in an intron (e.g., intron 1, 2, 3, 4, 5, 6, 7, 8, 9, 10, or 11), in a region downstream of the last exon of the FOXP3 gene, in an exon (e.g., exon 1, 2, 3, 4, 5, 6, 7, 8, 9, 10, 11, or 12), or in a junction between an intron and its adjacent exon.

The construct carrying the heterologous sequence can be introduced to the target cell by any known techniques such as chemical methods (e.g., calcium phosphate transfection and lipofection), non-chemical methods (e.g., electroporation and cell squeezing), particle-based methods (e.g., magnetofection), and viral transduction (e.g., by using viral vectors such as vaccinia vectors, adenoviral vectors, lentiviral vectors, adeno-associated viral (AAV) vectors, retroviral vectors, and hybrid viral vectors). In some embodiments, the construct is an AAV viral vector and is introduced to the target human cell by a recombinant AAV virion whose genome comprises the construct, including having the AAV Inverted Terminal Repeat (ITR) sequences on both ends to allow the production of the AAV virion in a production system such as an insect cell/baculovirus production system or a mammalian cell production system). See, e.g., FIG. 4. The AAV may be of any serotype, for example, AAV1, AAV2, AAV3, AAV4, AAV5, AAV6, AAV7, AAV8, AAV8.2, AAV9, or AAVrh10, of a pseudotype such as AAV2/8, AAV2/5, or AAV2/6.

The heterologous sequence may be integrated to the FOXP3 genomic locus by any site-specific gene knockin technique. Such techniques include, without limitation, homologous recombination, gene editing techniques based on zinc finger nucleases or nickases (collectively "ZFNs" herein), transcription activator-like effector nucleases or nickases (collectively "TALENs" herein), clustered regularly interspaced short palindromic repeat systems (CRISPR, such as those using Cas9 or cpf1), meganucleases, integrases, recombinases, and transposes. As illustrated below in the Working Examples, for site-specific gene editing, the editing nuclease typically generates a DNA break (e.g., a single- or double-stranded DNA break) in the targeted genomic sequence such that a donor polynucleotide having homology to the targeted genomic sequence (e.g., the construct described herein) is used as a template for repair of the DNA break, resulting in the introduction of the donor polynucleotide to the genomic site.

Gene editing techniques are well known in the art. See, e.g., U.S. Pat. Nos. 8,697,359, 8,771,945, 8,795,965, 8,865,406, 8,871,445, 8,889,356, 8,895,308, 8,906,616, 8,932,814, 8,945,839, 8,993,233, 8,999,641, 9,790,490, 10,000,772, 10,113,167, and 10,113,167 for CRISPR gene editing techniques. See, e.g., U.S. Pat. Nos. 8,735,153, 8,771,985, 8,772,008, 8,772,453, 8,921,112, 8,936,936, 8,945,868, 8,956,828, 9,234,187, 9,234,188, 9,238,803, 9,394,545, 9,428,756, 9,567,609, 9,597,357, 9,616,090, 9,717,759, 9,757,420, 9,765,360, 9,834,787, 9,957,526, 10,072,062, 10,081,661, 10,117,899, 10,155,011, and 10,260,062 for ZFN techniques and its applications in editing T cells and stem cells. The disclosures of the aforementioned patents are incorporated by reference herein in their entirety.

In gene editing techniques, the gene editing complex can be tailored to target specific genomic sites by altering the complex's DNA binding specificity. For example, in CRISPR technology, the guide RNA sequence can be designed to bind a specific genomic region; and in the ZFN technology, the zinc finger protein domain of the ZFN can be designed to have zinc fingers specific for a specific genomic region, such that the nuclease or nickase domains of the ZFN can cleave the genomic DNA at a site-specific manner. See further description in the Working Examples. Depending on the desired genomic target site, the gene editing complex can be designed accordingly. See, e.g., GenBank ID 50943 for the sequence and structure of the human FOXP3 gene.

Components of the gene editing complexes may be delivered into the target cells, concurrent with or sequential to the transgene construct, by well known methods such as electroporation, lipofection, microinjection, biolistics, virosomes, liposomes, lipid nanoparticles, immunoliposomes, polycation or lipid:nucleic acid conjugates, naked DNA or mRNA, and artificial virions. Sonoporation using, e.g., the Sonitron 2000 system (Rich-Mar) can also be used for delivery of nucleic acids. In particular embodiments, one or more components of the gene editing complex, including the nuclease or nickase, are delivered as mRNA into the cells to be edited.

IV. Safety Switch in Engineered Cells

In cell therapy, it may be desirable for the transplanted cells to contain a "safety switch" in their genomes, such that proliferation of the cells can be stopped when their presence in the patient is no longer desired. A safety switch may, for example, be a suicide gene, which upon administration of a pharmaceutical compound to the patient, will be activated or inactivated such that the cells enter apoptosis. A suicide gene may encode an enzyme not found in humans (e.g., a bacterial or viral enzyme) that converts a harmless substance into a toxic metabolite in the human cell. Examples of suicide genes include, without limitation, genes for thymidine kinases, cytosine deaminases, nitroreductases, intracellular antibodies, telomerases, caspases, and DNases. See, e.g., Zarogoulidis et al., *J Genet Syndr Gene Ther*. (2013) doi: 10.4172/2157-7412.1000139. In some embodiments, the suicide gene may be a thymidine kinase (TK) gene from Herpes Simplex Virus (HSV). A HSV-TK gene can be turned on so as to kill the cell by administration of ganciclovir, valganciclovir, famciclovir, or the like to the patient.

A safety switch may also be an "on" or "accelerator" switch, a gene encoding a small interfering RNA, an shRNA, or an antisense that interferences the expression of a cellular protein critical for cell survival.

The safety switch may utilize any suitable mammalian and other necessary transcription regulatory sequences. The safety switch can be introduced into the cell through random integration or site-specific integration using gene editing techniques described herein or other techniques known in the art. It may be desirable to integrate the safety switch in a genomic safe harbor such that the genetic stability and the clinical safety of the engineered cell are maintained. Examples of safe harbors are the AAVS1 locus; the ROSA26 locus; the CLYBL locus; the gene loci for albumin, CCR5, and CXCR4; and the locus where the endogenous gene is knocked out in the engineered cells (e.g., the T cell receptor alpha or beta chain gene locus, the HLA gene locus, the CIITA locus, or the β2-microglobulin gene locus).

V. Use of the Engineered Treg Cells

The genetically engineered Treg cells of the present disclosure can be used in cell therapy to treat a patient (e.g., a human patient) in need of induction of immune tolerance or restoration of immune homeostasis. The terms "treating" and "treatment" refer to alleviation or elimination of one or more symptoms of the treated condition, prevention of the occurrence or reoccurrence of the symptoms, reversal or remediation of tissue damage, and/or slowing of disease progression.

A patient herein may be one having or at risk of having an undesired inflammatory condition such as an autoimmune disease. Examples of autoimmune diseases are Addison's disease, AIDS, ankylosing spondylitis, anti-glomerular basement membrane disease autoimmune hepatitis, dermatitis, Goodpasture's syndrome, granulomatosis with polyangiitis, Graves' disease, Guillain-Barre syndrome, Hashimoto's thyroiditis, hemolytic anemia, Henoch-Schonlein purpura (HSP), juvenile arthritis, juvenile myositis, Kawasaki disease, inflammatory bowel diseases (such as Crohn's disease and ulcerative colitis), polymyositis, pulmonary alveolar proteinosis, multiple sclerosis, myasthenia gravis, neuromyelitis optica, PANDAS, psoriasis, psoriatic arthritis, rheumatoid arthritis, Sjögren's syndrome, systemic scleroderma, systemic sclerosis, systemic lupus erythematosus, thrombocytopenic purpura (TTP), Type I diabetes mellitus, uveitis, vasculitis, vitiligo, and Vogt-Koyanagi-Harada Disease.

In some embodiments, the Tregs are engineered to express from the FOXP3 locus a CAR targeting an autoantigen associated with an autoimmune disease, such as myelin oligodendrocyte glycoprotein (multiple sclerosis), myelin protein zero (autoimmune peripheral neuropathy), HIV env or gag protein (AIDS), myelin basic protein (multiple sclerosis), CD37 (systemic lupus erythematosus), CD20 (B-cell mediated autoimmune diseases), and IL-23R (inflammatory bowel diseases such as Crohn's disease or ulcerative colitis).

A patient herein may be one in need an allogeneic transplant, such as an allogeneic tissue or solid organ transplant or an allogeneic cell therapy. The Tregs of the present disclosure, such as those expressing CARs targeting one or more allogeneic MHC class I or II molecules, may be introduced to the patient, where the Tregs will home to the transplant and suppress allograft rejection elicited by the host immune system and/or graft-versus-host rejection. Patient in need of a tissue or organ transplant or an allogeneic cell therapy include those in need of, for example, kidney transplant, heart transplant, liver transplant, pancreas transplant, intestine transplant, vein transplant, bone marrow transplant, and skin graft; those in need of regenerative cell therapy; those in need of gene therapy (AAV-based gene therapy); and those in need in need of cancer CAR T therapy.

If desired, the patient receiving the engineered Tregs herein (which includes patients receiving engineered pluripotent or multipotent cells that will differentiate into Tregs in vivo) is treated with a mild myeloablative procedure prior to introduction of the cell graft or with a vigorous myeloablative conditioning regimen.

The FOXP3 engineered cells of the present disclosure may be provided in a pharmaceutical composition containing the cells and a pharmaceutically acceptable carrier. For example, the pharmaceutical composition comprises sterilized water, physiological saline or neutral buffered saline (e.g., phosphate-buffered saline), salts, antibiotics, isotonic agents, and other excipients (e.g., glucose, mannose, sucrose, dextrans, mannitol; proteins (e.g., human serum albumin); amino acids (e.g., glycine and arginine); antioxidants (e.g., glutathione); chelating agents (e.g., EDTA); and preservatives). The pharmaceutical composition may additionally comprise factors that are supportive of the Treg phenotype and growth (e.g., IL-2 and rapamycin or derivatives thereof), anti-inflammatory cytokines (e.g., IL-10, TGF-β, and IL-35), and other cells for cell therapy (e.g., CAR T effector cells for cancer therapy or cells for regenerative therapy). For storage and transportation, the cells optionally may be cryopreserved. Prior to use, the cells may be thawed and diluted in a pharmaceutically acceptable carrier.

The pharmaceutical composition of the present disclosure is administered to a patient in a therapeutically effective amount through systemic administration (e.g., through intravenous injection or infusion) or local injection or infusion to the tissue of interest (e.g., infusion through the hepatic artery, and injection to the brain, heart, or muscle). The term "therapeutically effective amount" refers to the amount of a pharmaceutical composition, or the number of cells, that when administered to the patient, is sufficient to effect the treatment.

In some embodiments, a single dosing unit of the pharmaceutical composition comprises more than $10^4$ cells (e.g., from about $10^5$ to about $10^6$ cells, from about $10^6$ to about $10^{10}$, from about $10^6$ to $10^7$, from about $10^6$ to $10^8$, from about $10^7$ to $10^8$, from about $10^7$ to $10^9$, or from about $10^8$ to $10^9$ cells). In certain embodiments, a single dosing unit of the composition comprises about $10^6$, about $10^7$, about $10^8$, about $10^9$, or about $10^{10}$ or more cells. The patient may be administered with the pharmaceutical composition once every two days, once every three days, once every four days, once a week, once every two weeks, once every three weeks, once a month, or at another frequency as necessary to establish a sufficient population of engineered Treg cells in the patient.

Pharmaceutical compositions comprising any of the zinc finger nucleases or other nucleases and polynucleotides as described herein are also provided.

Unless otherwise defined herein, scientific and technical terms used in connection with the present disclosure shall have the meanings that are commonly understood by those of ordinary skill in the art. Exemplary methods and materials are described below, although methods and materials similar or equivalent to those described herein can also be used in the practice or testing of the present disclosure. In case of conflict, the present specification, including definitions, will control. Generally, nomenclature used in connection with, and techniques of, cardiology, medicine, medicinal and pharmaceutical chemistry, and cell biology described herein are those well-known and commonly used in the art. Enzymatic reactions and purification techniques are performed according to manufacturer's specifications, as commonly accomplished in the art or as described herein. Further, unless otherwise required by context, singular terms shall include pluralities and plural terms shall include the singular. Throughout this specification and embodiments, the words "have" and "comprise," or variations such as "has," "having," "comprises," or "comprising," will be understood to imply the inclusion of a stated integer or group of integers but not the exclusion of any other integer or group of integers. All publications and other references mentioned herein are incorporated by reference in their entirety. Although a number of documents are cited herein, this citation does not constitute an admission that any of these documents forms part of the common general knowledge in the art. As used herein, the term "approximately" or "about" as applied to one or more values of interest refers to a value that is similar to a stated reference value. In certain embodiments, the term refers to a range of values that fall within 10%, 9%, 8%, 7%, 6%, 5%, 4%, 3%, 2%, 1%, or less in either direction (greater than or less than) of the stated reference value unless otherwise stated or otherwise evident from the context.

In order that this invention may be better understood, the following examples are set forth. These examples are for purposes of illustration only and are not to be construed as limiting the scope of the invention in any manner.

EXAMPLES

Example 1: Design of FOXP3-Specific Nucleases

Figure 2B:
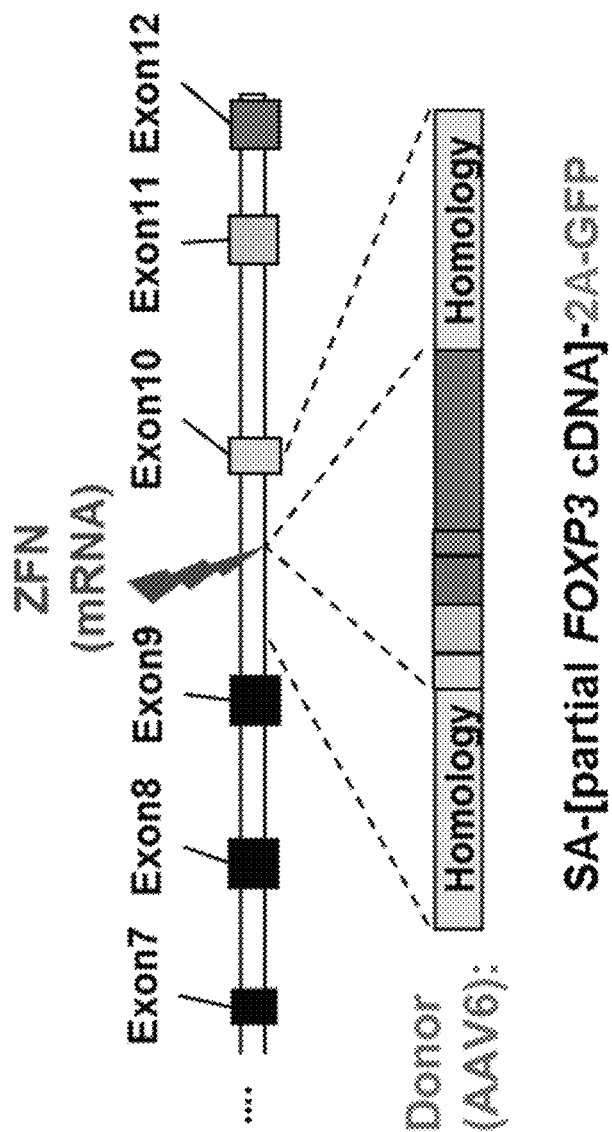
FIG. 2B is a schematic diagram depicting a similar genome editing approach to integrating a green fluorescent protein (GFP) coding sequence into intron 9 of the human FOXP3 gene.

FOXP3-specific ZFNs were constructed to enable site-specific introduction of double-stranded breaks at the human FOXP3 gene. ZFNs were designed essentially as described in Urnov et al., Nature (2005) 435(7042):646-651; Lombardo et al., Nat Biotechnol. (2007) 25(11):1298-306; U.S. Pat. Pub. Nos. 2008/0131962, 2015/016495, 2014/0120622, and 2014/0301990; and U.S. Pat. No. 8,956,828. The ZFN pair targeted intron 4, 9, or 10 in the FOXP3 gene (FIGS. 2B and 2D). The amino acid sequences of the recognition helices for the exemplary ZFN pair are shown below in Table 1. The target genomic sequence for each ZFN DNA binding domain is shown below in Table 2. Nucleotides in the genome that are targeted by the zinc finger protein (ZFP) recognition helices are indicated in uppercase letters; non-targeted nucleotides indicated in lowercase. Linkers used to join the FokI nuclease domain and the ZFP DNA binding domain are also shown (see, e.g., U.S. Pat. Pub. No. 2015/0132269). For example, the amino acid sequence of the domain linker L0 is DNA binding domain-QLVKS-FokI nuclease domain (SEQ ID NO: 7). Similarly, the amino acid sequences for the domain linker N7a is FokI nuclease domain-SGTPHEVGVYTL-DNA binding domain (SEQ ID NO:8), and N6a is FokI nuclease domain-SGAQGSTLDF-DNA binding domain (SEQ ID NO:9). Further, the expression constructs may comprise a WPRE sequence and a bovine growth hormone polyA sequence.

TABLE 1

Human FOXP3 Zinc-Finger Designs

| ZFN Name (target intron) | Zinc Finger Amino Acid Sequences (SEQ ID NO) | | | | | | Domain linker |
|---|---|---|---|---|---|---|---|
| | F1 | F2 | F3 | F4 | F5 | F6 | |
| SBS75606 (int. 9) | HAQGLRH (11) | QSGHLSR (12) | IRSTLRD (13) | HRSSLRR (14) | TSGHLSR (15) | QSGHLSR (12) | L0 |
| SBS75609 (int. 9) | TSSNRKT (16) | QSGHLSR (12) | RSDTLSV (17) | DNSTRIK (18) | RSDDLTR (19) | DRSTRRQ (20) | L0 |

TABLE 1-continued

Human FOXP3 Zinc-Finger Designs

| ZFN Name (target intron) | Zinc Finger Amino Acid Sequences (SEQ ID NO) | | | | | | Domain linker |
|---|---|---|---|---|---|---|---|
| | F1 | F2 | F3 | F4 | F5 | F6 | |
| SBS75893 (int. 10) | RSDHLSQ (21) | RSAVRKN (22) | QSSNLAR (23) | QSSDLRR (24) | RSDHLSQ (21) | ASSTRTK (25) | L0 |
| SBS75895 (int. 10) | SLTYLPT (26) | DRSALAR (27) | RSDHLSE (28) | AKHHRKT (29) | RSAHLSR (30) | TSGSLTR (31) | N6a |
| SBS75591 (int. 9) | RSAHLSR (30) | QSGHLSR (12) | RSDNLSV (92) | ASWTLTQ (32) | SNQNLTT (33) | DRSHLAR (34) | N7a |
| SBS75592 (int. 9) | DQSNLRA (35) | RSANLTR (36) | RSDNLST (37) | DNSYLPR (38) | QSGALAR (39) | QSANRTK (40) | L0 |
| SBS75714 (int. 10) | QSSDLSR (41) | RTDALRG (42) | DRSNLSR (43) | TSGNLTR (44) | RSDDLSK (45) | DSSHRTR (46) | L0 |
| SBS75715 (int. 10) | RSDNLST (37) | DRSALAR (27) | RSDHLST (47) | RSDALAR (48) | RSDNLSE (49) | ARSTRTN (50) | N7a |
| SBS76695 (int. 4) | RSDVLSE (51) | RLYTLHK (52) | RSDNLSA (53) | RNNDRKT (54) | SNQNLTT (33) | DRSHLAR (34) | L0 |
| SBS76698 (int. 4) | QSSDLSR (41) | QSGNLAR (55) | RSDNLST (37) | FHSCLSA (56) | PYYGRHG (57) | DRSHLAR (34) | N7a |
| SBS75683 (int. 10) | LRHHLTR (58) | VAEYRYK (59) | QSGHLAR (60) | QRTNLVE (61) | RSDHLSN (62) | QSHDRTK (63) | L0 |
| SBS75684 (int. 10) | RQDCLSL (64) | RNDNRKT (65) | TSGSLSR (66) | TRQNRDT (67) | QSSHLTR (68) | RLDNRTA (69) | N7a |
| SB75806 (int. 10) | QRNHRTT (70) | LRHHLTR (58) | RSDHLSA (71) | QSGHLSR (12) | TNHLLRT (72) | QSGHLSR (12) | L0 |
| SB75808 (int. 10) | RSDALSR (73) | QSGNLAR (55) | QSADRTK (74) | RSANLTR (36) | QRSNLVR (75) | TSGHLSR (15) | N7a | int: intron.

TABLE 2

Target Sequences for Human FOXP3 Zinc Fingers

| SBS* | Target Sequence (5' → 3') | SEQ ID NO |
|---|---|---|
| SBS75606 (int. 9) | aaGGAGGTGCTCCTGGAATTacttagca | 76 |
| SBS75609 (int. 9) | ctCCCCTGACCAAGGAAAATcggggtgg | 77 |
| SBS75893 (int. 10) | ggGCTAGGGCTGAAGTGAGGtgaaaggt | 78 |
| SBS75895 (int. 10) | agGTTGGGAGTGGGGTCTTGttcagggc | 79 |
| SBS75591 (int. 9) | tcGGCCATCAGAAGGGAGGGaccctgct | 80 |
| SBS75592 (int. 9) | gcTAAGTAaTTCCAGGAGCACctcctttt | 81 |
| SBS75714 (int. 10) | agGGATGGGATGACTTGGCTttaggtca | 82 |
| SBS75715 (int. 10) | ggACTCAGGTGGGGgGTCTAGggtgag | 83 |
| SBS76695 (int. 4) | acGGCCATTCGCAGGTGCTGacatttg | 84 |
| SBS76698 (int. 4) | caGGCTTCTGGCAGaGAAGCTtaaagac | 85 |
| SBS75683 (int. 10) | gcTCAGGGCAAGGATGAGGTtagttgtg | 86 |
| SBS75684 (int. 10) | gtCAGGGACATGGTTAGGTGgttaggct | 87 |
| SB75806 (int. 10) | aaGGATTTGGAAGGGGTAAAgggccagg | 88 |
| SB75808 (int. 10) | aaGGTGAAGGGTCAGAAGTGgggtcaag | 89 |

*SBS: Sangamo Biosciences Sequence.

All ZFNs were tested and found to bind to their target sites and found to be active as nucleases. Indels and targeted integration (TI) efficiency were quantified by MiSeq next generation sequencing. ZFNs targeted to each site within introns 4, 9, and 10 yielded high total levels of genome modifications, while intron 9 (site A) yielded the highest TI efficiency (the intended outcome) (FIGS. 2D and 2E). Thus, these ZFNs can be used to make genetic modifications (e.g., insertions and/or deletions) within a human FOXP3 gene, for example, at a target site shown in any one of SEQ ID NOs: 76-89, at a target site having 12-25 nucleotides of one of these sequences, at a site within 1-50 (e.g., 1 to 10) base pairs of these gene sequences, and/or between paired target sites.

The ZFNs used herein may also include one or more mutations to the phosphate contact residues of the ZFP and/or the FokI domain, for example, the nR-5Qabc mutant (to ZFP backbone) and/or R416S and/or K525S mutants (to FokI), as described in U.S. Pat. Pub. No. 2018/0087072. TALE nucleases and CRISPR/Cas systems targeted the aforementioned target sites can also be used. ZFP, TALE, and sRNA DNA-binding domains that recognize these target sites are also formulated into active engineered transcription factors when associated with one or more regulatory domains. Regulatory domains can include transcriptional activators or repressors, recombinases, integrases, nucleases, and nickases.

Example 2: ZFN Nuclease Activity In Vitro

The ZFNs described in Table 1 were tested for their nuclease activity in K562 cells. K562 cells were obtained from the American Type Culture Collection and grown as recommended in RPMI medium (Invitrogen) supplemented with 10% qualified fetal bovine serum (FBS, Cyclone).

To test DNA cleavage activity, mRNAs encoding pairs of human FOXP3-specific ZFNs were transfected into the K562 cells (SBS75606/SBS75609 (targeting intron 9), SBS75893/SBS75895 (targeting intron 10), SBS75591/SBS75592 (targeting intron 9), and SBS75714/SBS75715 (targeting intron 10)). For mRNA generation, open reading frames for the ZFNs were cloned into an expression vector optimized for production of mRNA bearing 5' and 3' UTRs and a synthetic polyA signal. The expression vector was either a pVAX-based vector containing a T7 promoter, the ZFN coding sequence, and a polyA motif for enzymatic addition of a polyA tail following the in vitro transcription reaction; or a pGEM-based vector containing a T7 promoter, a 5'UTR, the ZFN coding sequence, a 3'UTR and a 64 bp polyA stretch (SEQ ID NO: 93); or a PCR amplicon containing a T7 promoter, a 5'UTR, the ZFN coding sequence, a 3'UTR and a 60 bp polyA stretch (SEQ ID NO: 94). The mRNAs were generated from the expression vector using the mMessage mMachine™ T7 Ultra kit (Ambion) following manufacturer's instructions.

For transfection, one million K562 cells were mixed with 15 µg/mL or 3.75 µg/mL of each ZFN-encoding mRNA mix. Transfection was done in an Amaxa Nucleofector™ II™ using program T-16. Transfected cells were recovered into 1.4 mL warm RPMI medium+10% FBS. Three days following transfection, nuclease activity was assessed by deep sequencing (MiSeq, Illumina) as per standard protocols. The results are presented below in Table 3.

TABLE 3

Zinc Finger Nuclease Activity

| Pair # | ZFN pair | Target Intron | Indels (15 µg/mL) | Indels (3.75 µg/mL) |
|---|---|---|---|---|
| 1 | SBS75606/SBS75609 | 9 | 91.4 | 70.1 |
| 2 | SBS75893/SBS75895 | 10 | 91.3 | 76.6 |
| 3 | SBS75591/SBS75592 | 9 | 91.2 | 80.0 |
| 4 | SBS75714/SBS75715 | 10 | 90.7 | 84.0 |

*Indels: insertions and/or deletions.

The above data show that the ZFN nucleases described herein were active and induced cleavage and genomic modifications at the target sites.

Example 3: Purification of Regulatory and Effector T Cells

Tregs were isolated from fresh leukapheresis products (Leukopak) (Stem Cell Technologies, Canada) obtained from non-smoking, male donors under the age of 40. On the same day of delivery, the Leukopak was washed one time in CliniMACS® buffer (Miltenyi, Germany) supplemented with 2% human serum albumin (Octapharma, USA). The cells were then processed for Treg isolation using the EasySep™ Human CD4+CD127lowCD25+ Regulatory T cell Isolation Kit (Stem Cell Technologies, Canada) following manufacturer's instructions.

CD4+CD25− responder T (Tresponder) cells were isolated from the non-Treg fraction of the Leukopak using the same isolation kit. Donor-matching CD8+ Teffs were isolated from a portion of the Leukopak using the EasySep™ Human CD8 Positive Selection Kit II (StemCell Technologies, Canada) following manufacturer's instructions. Purity of the Tregs, Tresponders, and Teffs was assessed by flow cytometry. Cells were then frozen in CS10 (BioLife Solutions, USA) and stored in liquid nitrogen.

Treg, Teff, Tresponder phenotypes were assessed following purification and modification using antibodies specific for the following antigens: CD4, CD25, CD127, CD69, and FOXP3. A fixable viability dye was included to exclude dead or dying cells. FOXP3 intracellular staining was performed using the eBioscience Foxp3/Transcription Factor Staining Buffer set (Thermofisher, USA) after cell surface staining. CD8+ Teff purity was assessed by staining for CD8. Tresponders were CD4+CD25−.

FIG. 1A shows that the cell population was 87.8% lymphocytes. FIG. 1B shows that 93.6% of the lymphocytes were CD4+CD25+. FIG. 1C shows that among the CD4+CD25+ cells, only 0.25% was CD127+, while FIG. 1D shows that among the CD4+CD25+CD127− cells, 90.4% was FOXP3+. This phenotype, CD4+CD25+CD127−FOXP3+ is characteristic of Treg cells. The high levels of CD4+CD25+CD127−FOXP3+ cells indicate a highly purified population of Treg cells.

Example 4: Targeted Integration of a GFP Transgene and an HLA-A2 CAR in Isolated Tregs and CD8+Teffs ZFN mRNAs (SBS75591/SBS75592 pair) targeting an intronic region between Exons 9 and 10 of the human FOXP3 locus were engineered as described in Example 1. An AAV6 vector encoding a 5' splice acceptor, partial FOXP3 cDNA encompassing Exons 10-12, a coding sequence for a 2A self-cleaving peptide, and a coding sequence for either a green fluorescent protein (GFP; FIG. 2B) or an anti-HLA-A2 CAR (Boardman et al., supra; FIG. 5) were generated by standard cloning technology.

The HLA-A2 CAR construct is illustrated in FIGS. 2A and 4A-C. The CAR's antigen recognition domain is a scFv comprising a heavy chain variable domain (VH) from 3PB2 and a light chain variable domain (VL) from DPK1, wherein the VH and the VL are linked by a peptide linker sequence [G$_4$S]$_3$ (SEQ ID NO: 90). The HLA-A2 CAR construct comprises sequences encoding a hGMCSF surface expression signal sequence, the scFv, a Myc tag, the CD28 transmembrane (TM) domain, the CD28 co-stimulation domain and the CD3ζ signaling sequence (SEQ ID NO: 91).

Before use, Tregs were thawed and cultured for two days in RPMI supplemented with 10% human AB serum (Valley Biomedical) and 1000 U/mL of recombinant human IL-2 (CTS Thermofisher, USA). The Tregs were activated in the presence of CD3/CD28 Dynabeads™ (CTS Thermofisher, USA) prior to manipulation. Teffs were thawed and cultured for two days in the same media with 100 U/mL of recombinant human IL-2 and activated in the presence of CD3/CD28 Dynabeads™.

The ZFN mRNAs were introduced to cells by electroporation via a MaxCyte device following manufacturer's instructions or by BTX ECM® 830 Square Wave Electroporator (Harvard Bioscience, USA). The AAV transgene donor constructs were introduced into the cells at 1×10$^5$ viral genomes (vg) per cell.

All cell samples were analyzed on an Attune™ NxT Flow Cytometer (Thermofisher, USA) and data was analyzed using FlowJo software. Detection of HLA-A2 CAR in modified Tregs and Teffs was performed by first permeabilizing cells with the eBioscience Foxp3/Transcription Factor Staining Buffer set. Cells were then stained with an HLA-A2 dextramer conjugated to a fluorophore (Immudex, Denmark) and analyzed within two hours of staining as recommended by the manufacturer. GFP was detected through flow cytometry within the appropriate fluorescent channel.

Figure 2C:
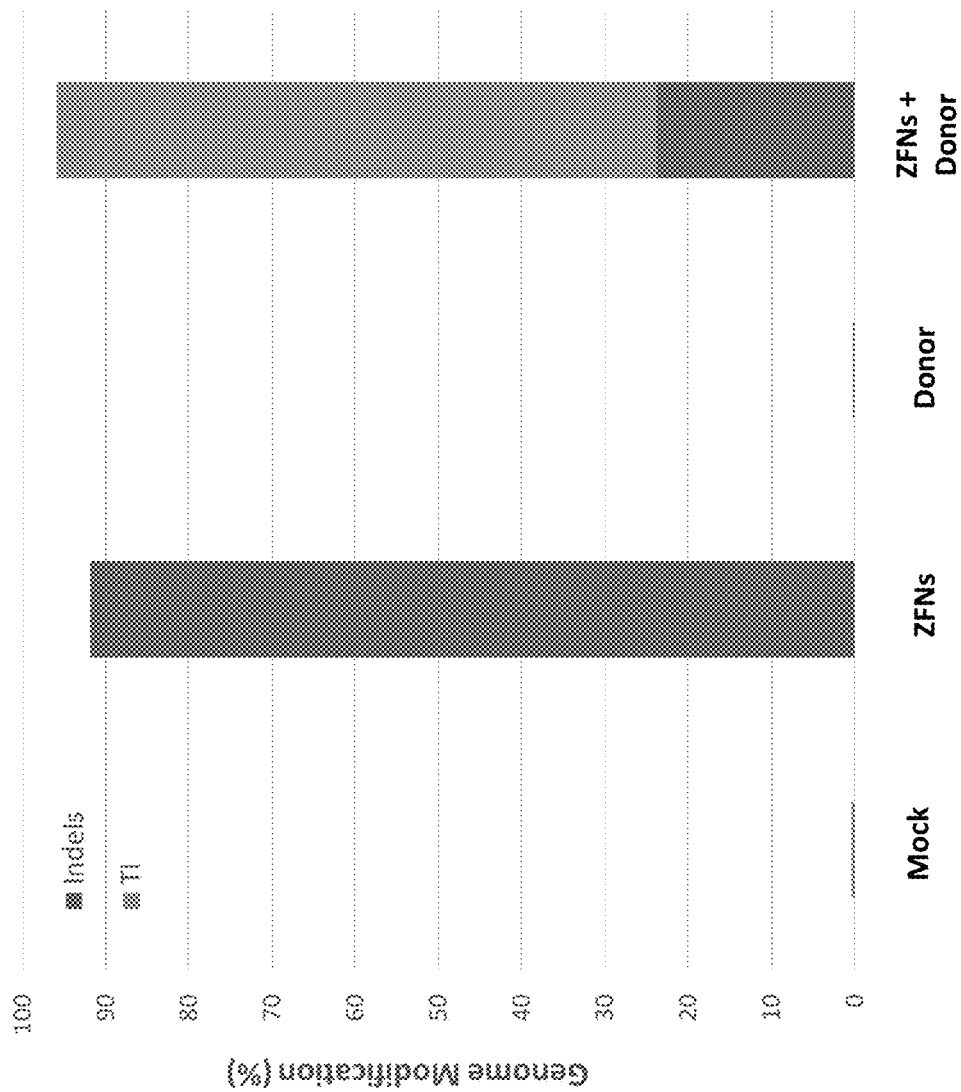
FIG. 2C is a bar graph showing the level of allelic genome modification as assessed by MiSeq next generation sequencing in the study shown in FIG. 2B. Indels: insertions/deletions. TI: targeted integration. Mock: cells treated with vehicle. ZFNs: cells transfected with mRNA of a ZFN targeting FOXP3 intron 9. Donor: cells transfected with the donor construct shown in FIG. 2B. ZFNs+Donor: cells transfected with the ZFN mRNA and the donor construct.
Figure 2E:
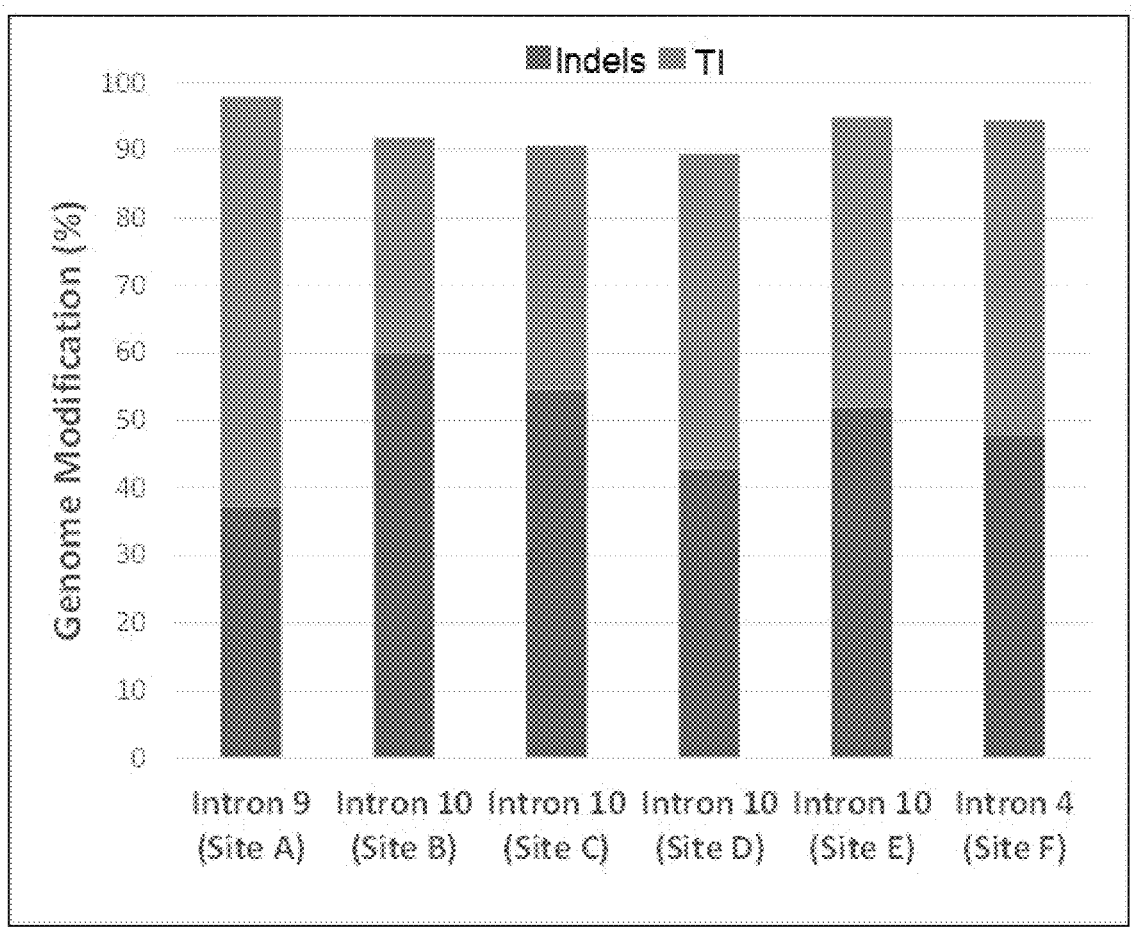
FIG. 2E is a bar graph summarizing the data shown in FIG. 2D and indicating the locations of the targeted sites A, B, C, D, E, and F.
Figures 3A, 3B, 3C:
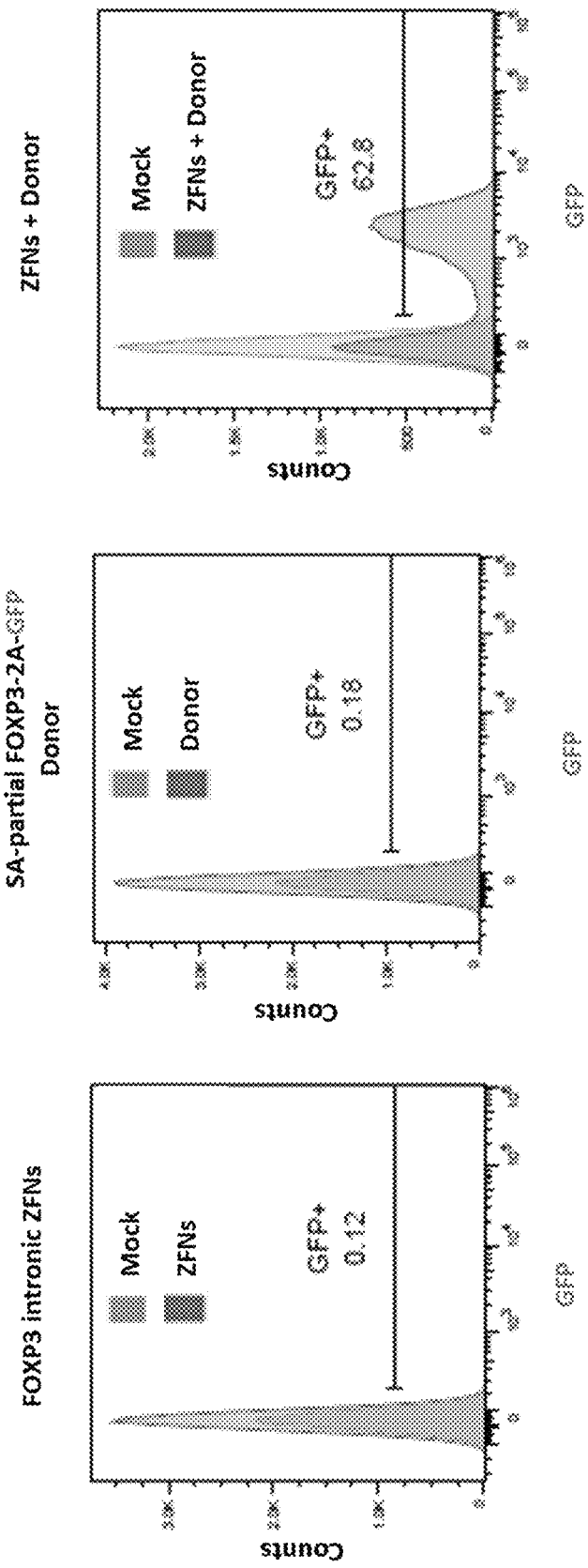
FIGS. 3A-C are flow cytometry graphs analyzing the same Tregs assessed in FIG. 2C. Mock: cells treated with vehicle. ZFNs: cells transfected with mRNA of a ZFN targeting FOXP3 intron 9. SA-partial FOXP3-2A-GFP: cells transfected with the donor construct shown in FIG. 2B. ZFNs+Donor: cells transfected with the ZFN mRNA and the donor construct.

As shown in FIG. 2C, the ZFNs alone induced >90% of total genome modification (indel: insertions/deletions). When ZFNs were co-delivered with the AAV GFP transgene construct, about 70% of the genomic modifications were targeted integration (TI) of the GFP transgene at the intended target site. The data in FIGS. 3A-C show that the fraction of cells expressing GFP and the level of GFP expression were similar between as Mock untreated cells in Tregs subjected to ZFNs (FIG. 3A) or AAV donor alone (FIG. 3B), whereas Tregs subjected to ZFNs as well as donor (FIG. 3C) yielded >60% of cells expressing GFP driven from the endogenous FOXP3 promoter.

Figures 5A, 5B, 5C:
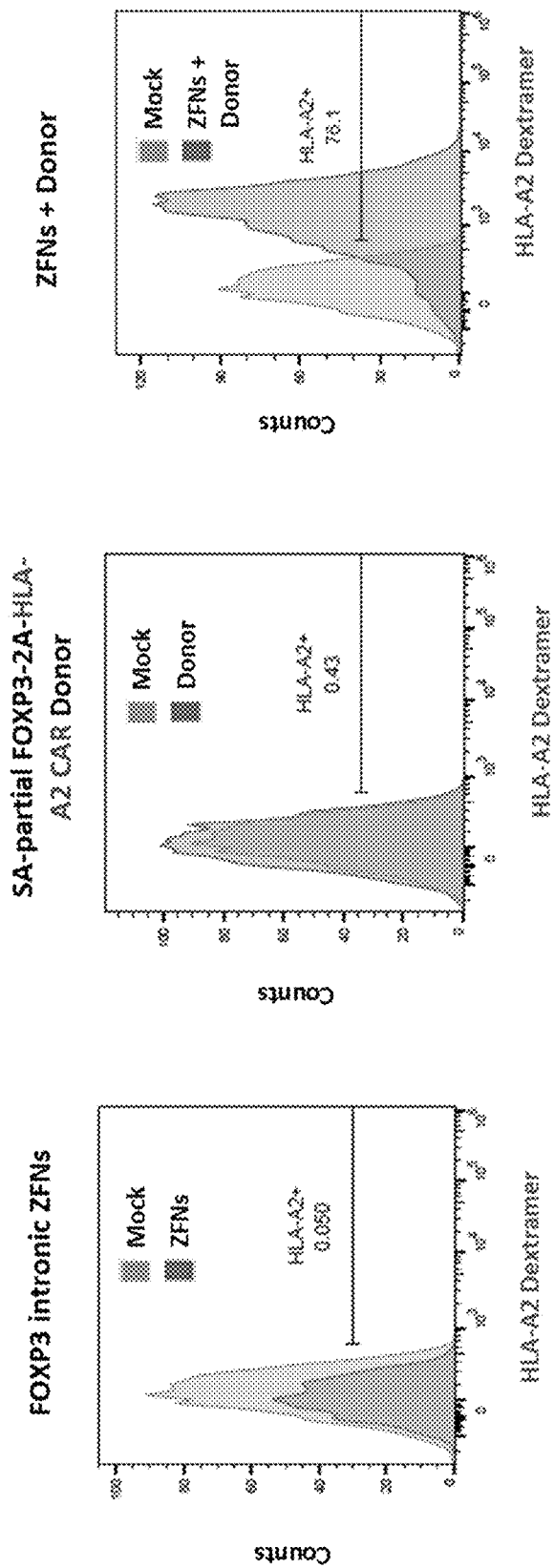
FIGS. 5A-C are flow cytometry graphs analyzing Tregs edited with the same ZFN and/or the donor construct shown in FIGS. 4B and 4C.
Figure 6C:
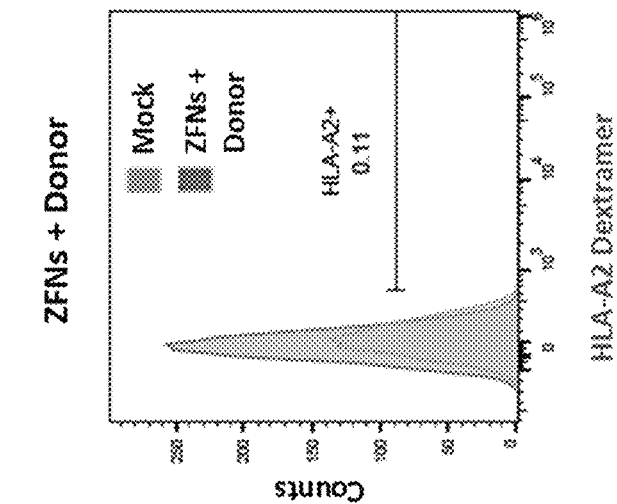
FIGS. 6A-C are flow cytometry graphs analyzing CD8+ effector T cells (Teff) edited with the same ZFN and/or the same donor construct used in FIGS. 4B and 4C.
Figure 6B:
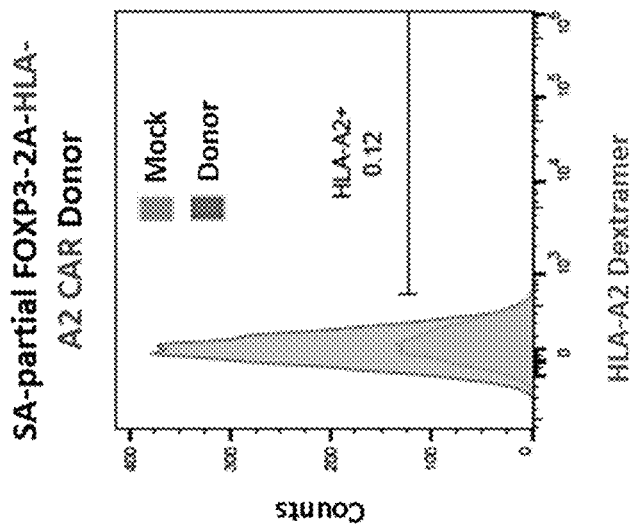
Figure 6A:
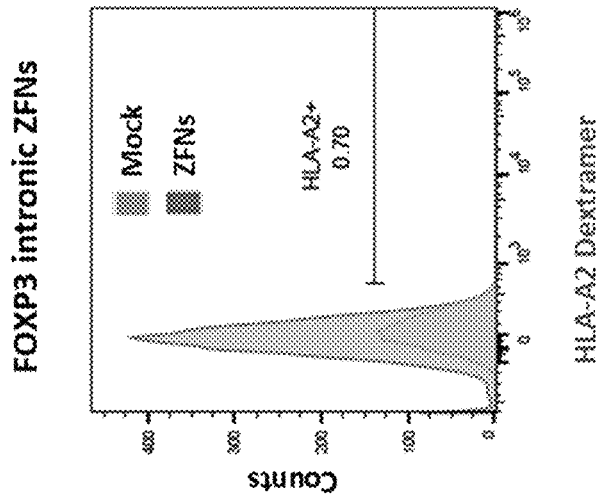

For HLA-A2 CAR-engineered T cells, the level of CAR+ cells that bound HLA-A2 dextramer was assessed by flow cytometry. In the Treg study, the fraction and level of HLA-A2-targeted scFv binding was shown to be the same as Mock untreated cells in Tregs subjected to ZFNs (FIG. 5A) or subjected to AAV donor alone (FIG. 5B). By contrast, Tregs subjected to ZFNs and the AAV donor (FIG. 5C) yielded >70% of Treg cells expressing HLA-A2 CAR under the control of the endogenous FOXP3 promoter. In the Teff study, the fraction and level of HLA-A2-targeted scFv binding was shown to be the same as Mock untreated cells in Teffs subjected to ZFNs (FIG. 6A) or subjected AAV donor alone (FIG. 6B). Unlike the Tregs, Teffs subjected to ZFNs and the AAV donor (FIG. 6C) also showed no CAR expression. These results indicate that only cells expressing FOXP3 (Tregs) expressed the HLA-A1 CAR and that the expression was regulated by the endogenous FOXP3 promoter, which was active on Treg cells but not in Teff cells.

Figure 7B:
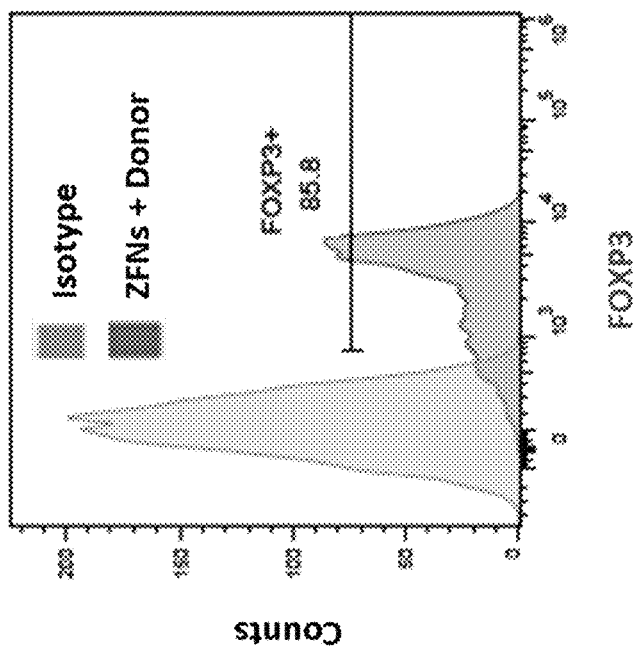
FIG. 7B: edited cells (cells treated with the ZFN and the AAV donor construct). "Isotype": control antibody having the same isotype as the anti-FOXP3 antibody (IgG antibody mixture isolated from un-immunized animals).
Figure 7A:
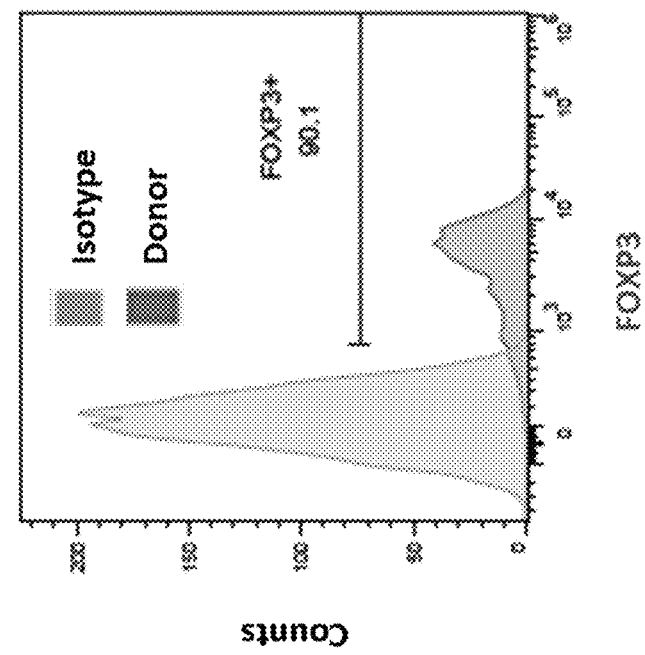
FIGS. 7A and B are flow cytometry graphs analyzing the fraction of FOXP3+ cells among the Treg cells of FIGS. 5A-C.

The data in FIG. 7A show that among the Treg cells transfected with the HLA-A2 CAR donor, 90.1% of the cells retained the FOXP3+ Treg phenotype. The data in FIG. 7B show that among the Tregs subjected to both the ZFNs and the AAV donor, a similarly high percentage of the cells (85.8%) retained the FOXP3+ Treg phenotype.

LIST OF SEQUENCES

The table below lists the amino acid and nucleotide sequences in the present disclosure and their respective SEQ ID NOs (SEQ).

| SEQ | SEQUENCES |
|---|---|
| 1 | DYGMH |
| 2 | FIRNDGSDKYYADSVKG |
| 3 | NGESGPLDYWYLDL |
| 4 | QVQLVQSGGGVVQPGGSLRVSCAASGVTLS<u>DYGMH</u>WVRQAPG KGLEWVA<u>FIRNDGSDKYYADSVKG</u>RFTISRDNSEKTVSLQMS SLRAEDTAVYYCAK<u>NGESGPLDYWYLDL</u>WGRGT (3PB2 VH; CDRs are in boxes) |
| 5 | LAGLIDADG |
| 6 | MVSKIRTFGWVQNPGKFENLKRVVQVFDRNSKVHNEVKNIKIPT LVKESKIQKELVAIMNQHDLIYTYKELVGTGTSIRSEAPCDAII QATIADQGNKKGYIDNWSSDGFLRWAHALGFIEYINKSDSFVIT DVGLAYSKSADGSAIEKEILIEAISSYPPAIRILTLLEDGQHLT KFDLGKNLGFSGESGFTSLPEGILLDTLANAMPKDKGEIRNNWE GSSDKYARMIGGWLDKLGLVKQGKKEFIIPTLGKPDNKEFISHA FKITGEGLKVLRRAKGSTKFTRVPKRVYWEMLATNLTDKEYVRT RRALILEILIKAGSLKIEQIQDNLKKLGFDEVIETIENDIKGLI NTGIFIEIKGRFYQLKDHILQFVIPNRGVTKQLVKSELEEKKSE LRHKLKYVPHEYIELIEIARNSTQDRILEMKVMEFFMKVYGYRG KHLGGSRKPDGAIYTVGSPIDYGVIVDTKAYSGGYNLPIGQADE MQRYVEENQTRNKHINPNEWWKVYPSSVTEFKFLFVSGHFKGNY KAQLTRLNHITNCNGAVLSVEELLIGGEMIKAGTLTLEEVRRKF NNGEINF |
| 7 | QLVKS |
| 8 | SGTPHEVGVYTL |
| 9 | SGAQGSTLDF |
| 10 | DIQMTQSPSSLSASVGDRVTITC<u>QASQDISNYLN</u>WYQQKPGKAP KLLIY<u>DASNLET</u>GVPSRFSGSGSGTDFTFTISSLQPEDIATYYC <u>QQYDNLP</u> (DPK1 VL; CDRs are in boxes) |
| 11 | HAQGLRH |
| 12 | QSGHLSR |
| 13 | IRSTLRD |
| 14 | HRSSLRR |
| 15 | TSGHLSR |
| 16 | TSSNRKT |
| 17 | RSDTLSV |
| 18 | DNSTRIK |
| 19 | RSDDLTR |
| 20 | DRSTRRQ |
| 21 | RSDHLSQ |

| SEQ | SEQUENCES |
|---|---|
| 22 | RSAVRKN |
| 23 | QSSNLAR |
| 24 | QSSDLRR |
| 25 | ASSTRTK |
| 26 | SLTYLPT |
| 27 | DRSALAR |
| 28 | RSDHLSE |
| 29 | AKHHRKT |
| 30 | RSAHLSR |
| 31 | TSGSLTR |
| 32 | ASWTLTQ |
| 33 | SNQNLTT |
| 34 | DRSHLAR |
| 35 | DQSNLRA |
| 36 | RSANLTR |
| 37 | RSDNLST |
| 38 | DNSYLPR |
| 39 | QSGALAR |
| 40 | QSANRTK |
| 41 | QSSDLSR |
| 42 | RTDALRG |
| 43 | DRSNLSR |
| 44 | TSGNLTR |
| 45 | RSDDLSK |
| 46 | DSSHRTR |
| 47 | RSDHLST |
| 48 | RSDALAR |
| 49 | RSDNLSE |
| 50 | ARSTRTN |
| 51 | RSDVLSE |
| 52 | RLYTLHK |
| 53 | RSDNLSA |
| 54 | RNNDRKT |
| 55 | QSGNLAR |
| 56 | FHSCLSA |
| 57 | PYYGRHG |
| 58 | LRHHLTR |
| 59 | VAEYRYK |
| 60 | QSGHLAR |
| 61 | QRTNLVE |
| 62 | RSDHLSN |
| 63 | QSHDRTK |
| 64 | RQDCLSL |
| 65 | RNDNRKT |
| 66 | TSGSLSR |
| 67 | TRQNRDT |
| 68 | QSSHLTR |
| 69 | RLDNRTA |
| 70 | QRNHRTT |
| 71 | RSDHLSA |
| 72 | TNHLLRT |
| 73 | RSDALSR |
| 74 | QSADRTK |
| 75 | QRSNLVR |
| 76 | aaGGAGGTGCTCCTGGAATTacttagca |
| 77 | ctCCCCTGACCAAGGAAAATcggggtgg |
| 78 | ggGCTAGGGCTGAAGTGAGGtgaaaggt |
| 79 | agGTTGGGAGTGGGGTCTTGttcagggc |
| 80 | tcGGCCATCAGAAGGGAGGGaccctgct |
| 81 | gcTAAGTAaTTCCAGGAGCACctcctttt |
| 82 | agGGATGGGATGACTTGGCTttaggtca |
| 83 | ggACTCAGGTGGGGgGTCTAGgggtgag |
| 84 | acGGCCATTCGCAGGTGCTGacattttg |
| 85 | caGGCTTCTGGCAGaGAAGCTaaagac |
| 86 | gcTCAGGGCAAGGATGAGGTtagttgtg |
| 87 | gtCAGGGACATGGTTAGGTGgttaggct |
| 88 | aaGGATTTGGAAGGGGTAAAgggccagg |
| 89 | aaGGTGAAGGGTCAGAAGTGgggtcaag |
| 90 | GGGGSGGGGSGGGGS |
| 91 | MLLLVTSLLLCELPHPAFLLIPQVQLVQSGGGVVQPGGSLRVSC AASGVTLSDYGMHWVRQAPGKGLEWVAFIRNDGSDKYYADSVKG RFTISRDNSEKTVSLQMSSLRAEDTAVYYCAKNGESGPLDYWYL DIWGRGTGGGGSGGGGSGGGGSDIQMTQSPSSLSASVGDRVTIT CQASQDISNYLNWYQQKPGKAPKLLIYDASNLETGVPSRFSGSG SGTDFTFTISSLQPEDIATYYCQQYDNLPEQKLISEEDLAAAIE VMYPPPYLDNEKSNGTIIHVKGKHLCPSPLFPGPSKPFWVLVVV GGVLACYSLLVTVAFIIFWVRSKRSRLLHSDYMNMTPRRPGPTR KHYQPYAPPRDFAAYRSRVKFSRSADAPAYQQGQNQLYNELNLG RREEYDVLDKRRGRDPEMGGKPRRKNPQEGLYNELQKDKMAEAY SEIGMKGERRRGKGHDGLYQGLSTATKDTYDALHMQALPPR (CDRs are in boxes) |

-continued

| SEQ | SEQUENCES | |
|---|---|---|
| 92 | RSDNLSV | 5 |
| 93 | AAAAAAAAAAAAAAAAAAAAAAAAAAAAAAAAAAAAAAAAAAAAAAAAAAAAAAAAAAAA | |
| 94 | AAAAAAAAAAAAAAAAAAAAAAAAAAAAAAAAAAAAAAAAAAAAAAAAAAAAAAAA | 10 |
| 95 | QVQLVESGGGVVQPGGSLRLSCAASGFTFSSYGMHWVRQAPGKG LEWVAFIRYDGSNKYYADSVKGRFTISRDNSKNTLYLQMNSLRA EDTAVYYCAK | |

What is claimed is:

1. A genetically engineered, isolated mammalian cell comprising a heterologous sequence at an integration site in intron 4, 9, or 10 of a FOXP3 locus in the genome, wherein the heterologous sequence comprises (i) a nucleotide sequence comprising contiguously all the FOXP3 exon sequences downstream of the integration site, (ii) a transgene, wherein the transgene is under the transcriptional control of the endogenous FOXP3 promoter in the FOXP3 locus; and (iii) a splice acceptor upstream of the nucleotide sequence to allow expression of a full-length FOXP3 mRNA transcript from the FOXP3 locus, wherein the heterologous sequence is integrated such that when the promoter is activated, the cell expresses both FOXP3 protein and a product of the transgene from the locus, wherein the full-length FOXP3 mRNA is transcribed, under the transcriptional control of the endogenous FOXP3 promoter, from a combination of the endogenous FOXP3 exon sequences upstream of the integration site and the nucleotide sequence of (i), wherein the nucleotide sequence of (i) makes up for the downstream FOXP3 exon sequences that can no longer be expressed due to disruption at the gene locus.

2. The cell of claim 1, wherein the heterologous sequence comprises, between (i) and (ii), an internal ribosome entry site (IRES), or a coding sequence for a self-cleaving peptide in-frame with (i) and (ii).

3. The cell of claim 2, wherein the self-cleaving peptide is a 2A peptide, optionally selected from the group consisting of a P2A peptide, an E2A peptide, an F2A peptide, and a T2A peptide.

4. The cell of claim 1, wherein the transgene product is a chimeric antigen receptor (CAR) or a T-cell receptor (TCR).

5. The cell of claim 4, wherein the CAR or the TCR is specific for (i) an autoantigen, (ii) a B cell antigen optionally selected from CD19 and CD20, or (iii) an allogeneic HLA class I molecule, wherein the class I molecule is optionally HLA-A2.

6. The cell of claim 1, wherein the transgene product is a cytokine, a chemokine, a growth factor, or a signaling factor; or an AAV capsid protein selected from VP1, VP2, or VP3.

7. The cell of claim 1, wherein the cell is a lymphoid cell, a lymphoid progenitor cell, a mesenchymal stem cell, a hematopoietic stem cell, an induced pluripotent stem cell, or an embryonic stem cell.

8. The cell of claim 7, wherein the cell is a regulatory T (Treg) cell.

9. The cell of claim 1, wherein the cell comprises a null mutation in a gene selected from a T cell receptor alpha chain gene or a T cell receptor beta chain gene, a Class II major histocompatibility complex transactivator (CIITA) gene, an HLA Class I or II gene, a transporter associated with antigen processing, a minor histocompatibility antigen gene, and a ß2 microglobulin (B2M) gene.

10. The cell of claim 1, wherein the cell is a human cell.

11. The cell of claim 1, wherein the cell comprises a suicide gene optionally selected from a HSV-TK gene, a cytosine deaminase gene, a nitroreductase gene, a cytochrome P450 gene, or a caspase-9 gene.

12. The cell of claim 1, wherein the heterologous sequence is integrated at intron 4.

13. The cell of claim 12, wherein the transgene product is a CAR or a TCR.

14. The cell of claim 13, wherein the cell is a Treg cell.

15. The cell of claim 1, wherein the heterologous sequence is integrated at intron 9.

16. The cell of claim 15, wherein the transgene product is a CAR or a TCR.

17. The cell of claim 16, wherein the cell is a Treg cell.

18. The cell of claim 1, wherein the heterologous sequence is integrated at intron 10.

19. The cell of claim 18, wherein the transgene product is a CAR or a TCR.

20. The cell of claim 19, wherein the cell is a Treg cell.

21. A method of making a genetically engineered mammalian cell, comprising:
(a) contacting an isolated mammalian cell with a nucleic acid construct comprising a heterologous sequence, wherein the heterologous sequence is flanked at the 5' end with a first homology region for integration into intron 4, 9, or 10 of a FOXP3 locus in the genome and at the 3' end with a second homology region for integration into intron 4, 9, or 10 of the FOXP3 locus, wherein the first and the second homology regions are both configured for integration into the same site in the FOXP3 locus, and wherein the heterologous sequence comprises
(i) a nucleotide sequence comprising contiguously all the FOXP3 exon sequences downstream of the integration site,
(ii) a transgene, wherein the transgene is under the transcriptional control of the endogenous FOXP3 promoter in the FOXP3 locus; and
(iii) a splice acceptor upstream of the nucleotide sequence to allow expression of a full-length FOXP3 mRNA transcript from the FOXP3 locus, and
(b) culturing the cell under conditions that allow the heterologous sequence to be integrated in intron 4, 9, or 10 of the FOXP3 locus such that when the promoter is activated, the cell expresses both FOXP3 protein and a product of the transgene from the locus, wherein the full-length FOXP3 mRNA is transcribed, under the transcriptional control of the endogenous FOXP3 promoter, from a combination of the endogenous FOXP3 exon sequences upstream of the integration site and the nucleotide sequence of (i), wherein the nucleotide sequence of (i) makes up for the downstream FOXP3 exon sequences that can no longer be expressed due to disruption at the gene locus.

22. The method of claim 21, wherein the heterologous sequence comprises, between (i) and (ii), an internal ribosome entry site (IRES), or a coding sequence for a self-cleaving peptide in-frame with (i) and (ii).

23. The method of claim 21, wherein the transgene product is a CAR or a TCR.

24. The method of claim 23, wherein the CAR or the TCR is specific for (i) an autoantigen, (ii) a B cell antigen optionally selected from CD19 and CD20, or (iii) an allogeneic HLA class I molecule, wherein the class I molecule is optionally HLA-A2.

25. The method of claim 21, wherein the cell comprises a null mutation in a gene selected from a T cell receptor alpha chain gene or a T cell receptor beta chain gene, a CIITA gene, an HLA Class I or II gene, a transporter associated with antigen processing, a minor histocompatibility antigen gene, and a ß2 microglobulin (B2M) gene.

* * * * *

SEQUENCE LISTING

<160> NUMBER OF SEQ ID NOS: 95

<210> SEQ ID NO 1
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Asp Tyr Gly Met His
1               5

<210> SEQ ID NO 2
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Phe Ile Arg Asn Asp Gly Ser Asp Lys Tyr Tyr Ala Asp Ser Val Lys
1               5                   10                  15

Gly

<210> SEQ ID NO 3
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Asn Gly Glu Ser Gly Pro Leu Asp Tyr Trp Tyr Leu Asp Leu
1               5                   10

<210> SEQ ID NO 4
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 4

Gln Val Gln Leu Val Gln Ser Gly Gly Gly Val Val Gln Pro Gly Gly
1               5                   10                  15

Ser Leu Arg Val Ser Cys Ala Ala Ser Gly Val Thr Leu Ser Asp Tyr
            20                  25                  30

Gly Met His Trp Val Arg Gln Ala Pro Gly Lys Gly Leu Glu Trp Val
            35                  40                  45

Ala Phe Ile Arg Asn Asp Gly Ser Asp Lys Tyr Tyr Ala Asp Ser Val
50                  55                  60

Lys Gly Arg Phe Thr Ile Ser Arg Asp Asn Ser Glu Lys Thr Val Ser
65                  70                  75                  80

Leu Gln Met Ser Ser Leu Arg Ala Glu Asp Thr Ala Val Tyr Tyr Cys
                85                  90                  95

Ala Lys Asn Gly Glu Ser Gly Pro Leu Asp Tyr Trp Tyr Leu Asp Leu
            100                 105                 110

Trp Gly Arg Gly Thr
            115

<210> SEQ ID NO 5
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Leu Ala Gly Leu Ile Asp Ala Asp Gly
1               5

<210> SEQ ID NO 6
<211> LENGTH: 579
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Met Val Ser Lys Ile Arg Thr Phe Gly Trp Val Gln Asn Pro Gly Lys
1               5                   10                  15

Phe Glu Asn Leu Lys Arg Val Val Gln Val Phe Asp Arg Asn Ser Lys
            20                  25                  30

Val His Asn Glu Val Lys Asn Ile Lys Ile Pro Thr Leu Val Lys Glu
            35                  40                  45

Ser Lys Ile Gln Lys Glu Leu Val Ala Ile Met Asn Gln His Asp Leu
50                  55                  60

Ile Tyr Thr Tyr Lys Glu Leu Val Gly Thr Gly Thr Ser Ile Arg Ser
65                  70                  75                  80

Glu Ala Pro Cys Asp Ala Ile Ile Gln Ala Thr Ile Ala Asp Gln Gly
            85                  90                  95

Asn Lys Lys Gly Tyr Ile Asp Asn Trp Ser Ser Asp Gly Phe Leu Arg
            100                 105                 110

Trp Ala His Ala Leu Gly Phe Ile Glu Tyr Ile Asn Lys Ser Asp Ser
            115                 120                 125

Phe Val Ile Thr Asp Val Gly Leu Ala Tyr Ser Lys Ser Ala Asp Gly
            130                 135                 140

Ser Ala Ile Glu Lys Glu Ile Leu Ile Glu Ala Ile Ser Ser Tyr Pro
145                 150                 155                 160

Pro Ala Ile Arg Ile Leu Thr Leu Leu Glu Asp Gly Gln His Leu Thr
            165                 170                 175

```
Lys Phe Asp Leu Gly Lys Asn Leu Gly Phe Ser Gly Glu Ser Gly Phe
            180                 185                 190

Thr Ser Leu Pro Glu Gly Ile Leu Leu Asp Thr Leu Ala Asn Ala Met
            195                 200                 205

Pro Lys Asp Lys Gly Glu Ile Arg Asn Asn Trp Glu Gly Ser Ser Asp
        210                 215                 220

Lys Tyr Ala Arg Met Ile Gly Gly Trp Leu Asp Lys Leu Gly Leu Val
225                 230                 235                 240

Lys Gln Gly Lys Lys Glu Phe Ile Ile Pro Thr Leu Gly Lys Pro Asp
                245                 250                 255

Asn Lys Glu Phe Ile Ser His Ala Phe Lys Ile Thr Gly Glu Gly Leu
            260                 265                 270

Lys Val Leu Arg Arg Ala Lys Gly Ser Thr Lys Phe Thr Arg Val Pro
            275                 280                 285

Lys Arg Val Tyr Trp Glu Met Leu Ala Thr Asn Leu Thr Asp Lys Glu
        290                 295                 300

Tyr Val Arg Thr Arg Arg Ala Leu Ile Leu Glu Ile Leu Ile Lys Ala
305                 310                 315                 320

Gly Ser Leu Lys Ile Glu Gln Ile Gln Asp Asn Leu Lys Lys Leu Gly
                325                 330                 335

Phe Asp Glu Val Ile Glu Thr Ile Glu Asn Asp Ile Lys Gly Leu Ile
            340                 345                 350

Asn Thr Gly Ile Phe Ile Glu Ile Lys Gly Arg Phe Tyr Gln Leu Lys
            355                 360                 365

Asp His Ile Leu Gln Phe Val Ile Pro Asn Arg Gly Val Thr Lys Gln
        370                 375                 380

Leu Val Lys Ser Glu Leu Glu Glu Lys Ser Glu Leu Arg His Lys
385                 390                 395                 400

Leu Lys Tyr Val Pro His Glu Tyr Ile Glu Leu Ile Glu Ile Ala Arg
                405                 410                 415

Asn Ser Thr Gln Asp Arg Ile Leu Glu Met Lys Val Met Glu Phe Phe
            420                 425                 430

Met Lys Val Tyr Gly Tyr Arg Gly Lys His Leu Gly Gly Ser Arg Lys
            435                 440                 445

Pro Asp Gly Ala Ile Tyr Thr Val Gly Ser Pro Ile Asp Tyr Gly Val
        450                 455                 460

Ile Val Asp Thr Lys Ala Tyr Ser Gly Gly Tyr Asn Leu Pro Ile Gly
465                 470                 475                 480

Gln Ala Asp Glu Met Gln Arg Tyr Val Glu Glu Asn Gln Thr Arg Asn
                485                 490                 495

Lys His Ile Asn Pro Asn Glu Trp Trp Lys Val Tyr Pro Ser Ser Val
            500                 505                 510

Thr Glu Phe Lys Phe Leu Phe Val Ser Gly His Phe Lys Gly Asn Tyr
            515                 520                 525

Lys Ala Gln Leu Thr Arg Leu Asn His Ile Thr Asn Cys Asn Gly Ala
        530                 535                 540

Val Leu Ser Val Glu Glu Leu Ile Gly Gly Glu Met Ile Lys Ala
545                 550                 555                 560

Gly Thr Leu Thr Leu Glu Glu Val Arg Arg Lys Phe Asn Asn Gly Glu
                565                 570                 575

Ile Asn Phe
```

```
<210> SEQ ID NO 7
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Gln Leu Val Lys Ser
1               5

<210> SEQ ID NO 8
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Ser Gly Thr Pro His Glu Val Gly Val Tyr Thr Leu
1               5                   10

<210> SEQ ID NO 9
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Ser Gly Ala Gln Gly Ser Thr Leu Asp Phe
1               5                   10

<210> SEQ ID NO 10
<211> LENGTH: 95
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
                20                  25                  30

Leu Asn Trp Tyr Gln Gln Lys Pro Gly Lys Ala Pro Lys Leu Leu Ile
            35                  40                  45

Tyr Asp Ala Ser Asn Leu Glu Thr Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Tyr Asp Asn Leu Pro
                85                  90                  95

<210> SEQ ID NO 11
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 11

His Ala Gln Gly Leu Arg His
1               5

<210> SEQ ID NO 12
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Gln Ser Gly His Leu Ser Arg
1               5

<210> SEQ ID NO 13
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Ile Arg Ser Thr Leu Arg Asp
1               5

<210> SEQ ID NO 14
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

His Arg Ser Ser Leu Arg Arg
1               5

<210> SEQ ID NO 15
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Thr Ser Gly His Leu Ser Arg
1               5

<210> SEQ ID NO 16
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Thr Ser Ser Asn Arg Lys Thr
1               5

<210> SEQ ID NO 17
<211> LENGTH: 7
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 17

Arg Ser Asp Thr Leu Ser Val
1               5

<210> SEQ ID NO 18
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Asp Asn Ser Thr Arg Ile Lys
1               5

<210> SEQ ID NO 19
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Arg Ser Asp Asp Leu Thr Arg
1               5

<210> SEQ ID NO 20
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Asp Arg Ser Thr Arg Arg Gln
1               5

<210> SEQ ID NO 21
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Arg Ser Asp His Leu Ser Gln
1               5

<210> SEQ ID NO 22
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Arg Ser Ala Val Arg Lys Asn
1               5
```

<210> SEQ ID NO 23
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Gln Ser Ser Asn Leu Ala Arg
1               5

<210> SEQ ID NO 24
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Gln Ser Ser Asp Leu Arg Arg
1               5

<210> SEQ ID NO 25
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Ala Ser Ser Thr Arg Thr Lys
1               5

<210> SEQ ID NO 26
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Ser Leu Thr Tyr Leu Pro Thr
1               5

<210> SEQ ID NO 27
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Asp Arg Ser Ala Leu Ala Arg
1               5

<210> SEQ ID NO 28
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

```
<400> SEQUENCE: 28

Arg Ser Asp His Leu Ser Glu
1               5

<210> SEQ ID NO 29
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Ala Lys His His Arg Lys Thr
1               5

<210> SEQ ID NO 30
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Arg Ser Ala His Leu Ser Arg
1               5

<210> SEQ ID NO 31
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 31

Thr Ser Gly Ser Leu Thr Arg
1               5

<210> SEQ ID NO 32
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

Ala Ser Trp Thr Leu Thr Gln
1               5

<210> SEQ ID NO 33
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 33

Ser Asn Gln Asn Leu Thr Thr
1               5

<210> SEQ ID NO 34
<211> LENGTH: 7
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 34

Asp Arg Ser His Leu Ala Arg
1               5

<210> SEQ ID NO 35
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 35

Asp Gln Ser Asn Leu Arg Ala
1               5

<210> SEQ ID NO 36
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

Arg Ser Ala Asn Leu Thr Arg
1               5

<210> SEQ ID NO 37
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Arg Ser Asp Asn Leu Ser Thr
1               5

<210> SEQ ID NO 38
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

Asp Asn Ser Tyr Leu Pro Arg
1               5

<210> SEQ ID NO 39
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 39

Gln Ser Gly Ala Leu Ala Arg
```

```
1               5

<210> SEQ ID NO 40
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 40

Gln Ser Ala Asn Arg Thr Lys
1               5

<210> SEQ ID NO 41
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 41

Gln Ser Ser Asp Leu Ser Arg
1               5

<210> SEQ ID NO 42
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 42

Arg Thr Asp Ala Leu Arg Gly
1               5

<210> SEQ ID NO 43
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 43

Asp Arg Ser Asn Leu Ser Arg
1               5

<210> SEQ ID NO 44
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 44

Thr Ser Gly Asn Leu Thr Arg
1               5

<210> SEQ ID NO 45
<211> LENGTH: 7
<212> TYPE: PRT
<213> ORGANISM: Artificial Sequence
<220> FEATURE:
<223> OTHER INFORMATION: Description of Artificial Sequence: Synthetic
``` peptide

<400> SEQUENCE: 45

Arg Ser Asp Asp Leu Ser Lys
1               5

<210> SEQ ID NO 46
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 46

Asp Ser Ser His Arg Thr Arg
1               5

<210> SEQ ID NO 47
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Arg Ser Asp His Leu Ser Thr
1               5

<210> SEQ ID NO 48
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 48

Arg Ser Asp Ala Leu Ala Arg
1               5

<210> SEQ ID NO 49
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 49

Arg Ser Asp Asn Leu Ser Glu
1               5

<210> SEQ ID NO 50
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 50

Ala Arg Ser Thr Arg Thr Asn
1               5

<210> SEQ ID NO 51

```
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 51

Arg Ser Asp Val Leu Ser Glu
1               5

<210> SEQ ID NO 52
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 52

Arg Leu Tyr Thr Leu His Lys
1               5

<210> SEQ ID NO 53
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 53

Arg Ser Asp Asn Leu Ser Ala
1               5

<210> SEQ ID NO 54
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 54

Arg Asn Asn Asp Arg Lys Thr
1               5

<210> SEQ ID NO 55
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 55

Gln Ser Gly Asn Leu Ala Arg
1               5

<210> SEQ ID NO 56
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56
```

Phe His Ser Cys Leu Ser Ala
1               5

<210> SEQ ID NO 57
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 57

Pro Tyr Tyr Gly Arg His Gly
1               5

<210> SEQ ID NO 58
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 58

Leu Arg His His Leu Thr Arg
1               5

<210> SEQ ID NO 59
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 59

Val Ala Glu Tyr Arg Tyr Lys
1               5

<210> SEQ ID NO 60
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 60

Gln Ser Gly His Leu Ala Arg
1               5

<210> SEQ ID NO 61
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 61

Gln Arg Thr Asn Leu Val Glu
1               5

<210> SEQ ID NO 62
<211> LENGTH: 7
<212> TYPE: PRT
<213> ORGANISM: Artificial Sequence
<220> FEATURE:

<223> OTHER INFORMATION: Description of Artificial Sequence: Synthetic
      peptide

<400> SEQUENCE: 62

Arg Ser Asp His Leu Ser Asn
1               5

<210> SEQ ID NO 63
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 63

Gln Ser His Asp Arg Thr Lys
1               5

<210> SEQ ID NO 64
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 64

Arg Gln Asp Cys Leu Ser Leu
1               5

<210> SEQ ID NO 65
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 65

Arg Asn Asp Asn Arg Lys Thr
1               5

<210> SEQ ID NO 66
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 66

Thr Ser Gly Ser Leu Ser Arg
1               5

<210> SEQ ID NO 67
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 67

Thr Arg Gln Asn Arg Asp Thr
1               5

```
<210> SEQ ID NO 68
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 68

Gln Ser Ser His Leu Thr Arg
1               5

<210> SEQ ID NO 69
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 69

Arg Leu Asp Asn Arg Thr Ala
1               5

<210> SEQ ID NO 70
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 70

Gln Arg Asn His Arg Thr Thr
1               5

<210> SEQ ID NO 71
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 71

Arg Ser Asp His Leu Ser Ala
1               5

<210> SEQ ID NO 72
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 72

Thr Asn His Leu Leu Arg Thr
1               5

<210> SEQ ID NO 73
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 73
```

Arg Ser Asp Ala Leu Ser Arg
1               5

<210> SEQ ID NO 74
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 74

Gln Ser Ala Asp Arg Thr Lys
1               5

<210> SEQ ID NO 75
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 75

Gln Arg Ser Asn Leu Val Arg
1               5

<210> SEQ ID NO 76
<211> LENGTH: 28
<212> TYPE: DNA
<213> ORGANISM: Homo sapiens

<400> SEQUENCE: 76
aaggaggtgc tcctggaatt acttagca                                      28

<210> SEQ ID NO 77
<211> LENGTH: 28
<212> TYPE: DNA
<213> ORGANISM: Homo sapiens

<400> SEQUENCE: 77
ctcccctgac caaggaaaat cggggtgg                                      28

<210> SEQ ID NO 78
<211> LENGTH: 28
<212> TYPE: DNA
<213> ORGANISM: Homo sapiens

<400> SEQUENCE: 78
gggctagggc tgaagtgagg tgaaaggt                                      28

<210> SEQ ID NO 79
<211> LENGTH: 28
<212> TYPE: DNA
<213> ORGANISM: Homo sapiens

<400> SEQUENCE: 79
aggttgggag tggggtcttg ttcagggc                                      28

<210> SEQ ID NO 80
<211> LENGTH: 28
<212> TYPE: DNA
<213> ORGANISM: Homo sapiens

<400> SEQUENCE: 80

-continued tcggccatca gaagggaggg accctgct         28

<210> SEQ ID NO 81
<211> LENGTH: 28
<212> TYPE: DNA
<213> ORGANISM: Homo sapiens

<400> SEQUENCE: 81
gctaagtaat tccaggagca cctccttt         28

<210> SEQ ID NO 82
<211> LENGTH: 28
<212> TYPE: DNA
<213> ORGANISM: Homo sapiens

<400> SEQUENCE: 82
agggatggga tgacttggct ttaggtca         28

<210> SEQ ID NO 83
<211> LENGTH: 28
<212> TYPE: DNA
<213> ORGANISM: Homo sapiens

<400> SEQUENCE: 83
ggactcaggt gggggtcta ggggtgag         28

<210> SEQ ID NO 84
<211> LENGTH: 28
<212> TYPE: DNA
<213> ORGANISM: Homo sapiens

<400> SEQUENCE: 84
acggccattc gcaggtgctg acattttg         28

<210> SEQ ID NO 85
<211> LENGTH: 28
<212> TYPE: DNA
<213> ORGANISM: Homo sapiens

<400> SEQUENCE: 85
caggcttctg gcagagaagc ttaaagac         28

<210> SEQ ID NO 86
<211> LENGTH: 28
<212> TYPE: DNA
<213> ORGANISM: Homo sapiens

<400> SEQUENCE: 86
gctcagggca aggatgaggt tagttgtg         28

<210> SEQ ID NO 87
<211> LENGTH: 28
<212> TYPE: DNA
<213> ORGANISM: Homo sapiens

<400> SEQUENCE: 87
gtcagggaca tggttaggtg gttaggct         28

<210> SEQ ID NO 88
<211> LENGTH: 28
<212> TYPE: DNA
<213> ORGANISM: Homo sapiens

<400> SEQUENCE: 88
aaggatttgg aagggtaaa gggccagg                                    28

<210> SEQ ID NO 89
<211> LENGTH: 28
<212> TYPE: DNA
<213> ORGANISM: Homo sapiens

<400> SEQUENCE: 89
aaggtgaagg gtcagaagtg gggtcaag                                   28

<210> SEQ ID NO 90
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 90

Gly Gly Gly Gly Ser Gly Gly Gly Gly Ser Gly Gly Gly Gly Ser
1               5                   10                  15

<210> SEQ ID NO 91
<211> LENGTH: 481
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 91

Met Leu Leu Leu Val Thr Ser Leu Leu Cys Glu Leu Pro His Pro
1               5                   10                  15

Ala Phe Leu Leu Ile Pro Gln Val Gln Leu Val Gln Ser Gly Gly
                20                  25                  30

Val Val Gln Pro Gly Gly Ser Leu Arg Val Ser Cys Ala Ala Ser Gly
                35                  40                  45

Val Thr Leu Ser Asp Tyr Gly Met His Trp Val Arg Gln Ala Pro Gly
                50                  55                  60

Lys Gly Leu Glu Trp Val Ala Phe Ile Arg Asn Asp Gly Ser Asp Lys
65                  70                  75                  80

Tyr Tyr Ala Asp Ser Val Lys Gly Arg Phe Thr Ile Ser Arg Asp Asn
                85                  90                  95

Ser Glu Lys Thr Val Ser Leu Gln Met Ser Ser Leu Arg Ala Glu Asp
                100                 105                 110

Thr Ala Val Tyr Tyr Cys Ala Lys Asn Gly Glu Ser Gly Pro Leu Asp
                115                 120                 125

Tyr Trp Tyr Leu Asp Leu Trp Gly Arg Gly Thr Gly Gly Gly Gly Ser
            130                 135                 140

Gly Gly Gly Gly Ser Gly Gly Gly Gly Ser Asp Ile Gln Met Thr Gln
145                 150                 155                 160

Ser Pro Ser Ser Leu Ser Ala Ser Val Gly Asp Arg Val Thr Ile Thr
                165                 170                 175

Cys Gln Ala Ser Gln Asp Ile Ser Asn Tyr Leu Asn Trp Tyr Gln Gln
                180                 185                 190

Lys Pro Gly Lys Ala Pro Lys Leu Leu Ile Tyr Asp Ala Ser Asn Leu
                195                 200                 205

Glu Thr Gly Val Pro Ser Arg Phe Ser Gly Ser Gly Ser Gly Thr Asp

```
                210               215                 220
Phe Thr Phe Thr Ile Ser Ser Leu Gln Pro Glu Asp Ile Ala Thr Tyr
225                 230                 235                 240

Tyr Cys Gln Gln Tyr Asp Asn Leu Pro Glu Gln Lys Leu Ile Ser Glu
                245                 250                 255

Glu Asp Leu Ala Ala Ala Ile Glu Val Met Tyr Pro Pro Tyr Leu
            260                 265                 270

Asp Asn Glu Lys Ser Asn Gly Thr Ile Ile His Val Lys Gly Lys His
            275                 280                 285

Leu Cys Pro Ser Pro Leu Phe Pro Gly Pro Ser Lys Pro Phe Trp Val
            290                 295                 300

Leu Val Val Gly Gly Val Leu Ala Cys Tyr Ser Leu Leu Val Thr
305                 310                 315                 320

Val Ala Phe Ile Ile Phe Trp Val Arg Ser Lys Arg Ser Arg Leu Leu
                325                 330                 335

His Ser Asp Tyr Met Asn Met Thr Pro Arg Arg Pro Gly Pro Thr Arg
            340                 345                 350

Lys His Tyr Gln Pro Tyr Ala Pro Pro Arg Asp Phe Ala Ala Tyr Arg
            355                 360                 365

Ser Arg Val Lys Phe Ser Arg Ser Ala Asp Ala Pro Ala Tyr Gln Gln
370                 375                 380

Gly Gln Asn Gln Leu Tyr Asn Glu Leu Asn Leu Gly Arg Arg Glu Glu
385                 390                 395                 400

Tyr Asp Val Leu Asp Lys Arg Gly Arg Asp Pro Glu Met Gly Gly
                405                 410                 415

Lys Pro Arg Arg Lys Asn Pro Gln Glu Gly Leu Tyr Asn Glu Leu Gln
                420                 425                 430

Lys Asp Lys Met Ala Glu Ala Tyr Ser Glu Ile Gly Met Lys Gly Glu
            435                 440                 445

Arg Arg Arg Gly Lys Gly His Asp Gly Leu Tyr Gln Gly Leu Ser Thr
            450                 455                 460

Ala Thr Lys Asp Thr Tyr Asp Ala Leu His Met Gln Ala Leu Pro Pro
465                 470                 475                 480

Arg

<210> SEQ ID NO 92
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 92

Arg Ser Asp Asn Leu Ser Val
1               5

<210> SEQ ID NO 93
<211> LENGTH: 64
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 93
aaaaaaaaaa aaaaaaaaaa aaaaaaaaaa aaaaaaaaaa aaaaaaaaaa aaaaaaaa        60
```

```
aaaa                                                                    64

<210> SEQ ID NO 94
<211> LENGTH: 60
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 94
aaaaaaaaaa aaaaaaaaaa aaaaaaaaaa aaaaaaaaaa aaaaaaaaaa aaaaaaaaaa      60

<210> SEQ ID NO 95
<211> LENGTH: 98
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 95

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
        35                  40                  45

Ala Phe Ile Arg Tyr Asp Gly Ser Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys
```